US012477195B2

(12) United States Patent
Denoual et al.

(10) Patent No.: US 12,477,195 B2
(45) Date of Patent: Nov. 18, 2025

(54) METHODS AND DEVICES FOR IMPROVING STORAGE AND TRANSMISSION OF UNCOMPRESSED DATA WHILE USING A STANDARD FORMAT

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Val D'Anast (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/721,859

(22) Filed: Apr. 15, 2022

(65) Prior Publication Data
US 2022/0337922 A1   Oct. 20, 2022

(30) Foreign Application Priority Data
Apr. 16, 2021   (GB) .................................... 2105488

(51) Int. Cl.
*H04N 21/854* (2011.01)
*H04N 19/176* (2014.01)
*H04N 19/70* (2014.01)
*H04N 21/235* (2011.01)
*H04N 21/845* (2011.01)

(52) U.S. Cl.
CPC ..... *H04N 21/85406* (2013.01); *H04N 19/176* (2014.11); *H04N 19/70* (2014.11); *H04N 21/2353* (2013.01); *H04N 21/845* (2013.01)

(58) Field of Classification Search
CPC ............. G06V 20/47; H04N 21/25816; H04N 21/6181; H04N 21/633; H04L 67/133
USPC ............................................................ 709/231
See application file for complete search history.

(56) References Cited

U.S. PATENT DOCUMENTS

| 5,561,688 A | * | 10/1996 | Jones, Jr. ............. H04B 14/066 375/240 |
| 6,825,847 B1 | * | 11/2004 | Molnar .................. G09G 5/393 345/611 |
| 8,719,437 B1 | * | 5/2014 | Bazzarella, Jr. ............................ H04N 21/440218 709/219 |
| 2005/0174188 A1 | * | 8/2005 | Koyanagi ............... H03M 7/30 333/14 |
| 2007/0186005 A1 | * | 8/2007 | Setlur ..................... H04L 65/70 375/E7.076 |

(Continued)

FOREIGN PATENT DOCUMENTS

| EP | 2312849 A1 | 4/2011 |
| GB | 2527786 A | 1/2016 |

(Continued)

*Primary Examiner* — Benjamin R Bruckart
(74) *Attorney, Agent, or Firm* — Canon U.S.A., Inc. IP Division

(57) ABSTRACT

A method for encapsulating media data into an ISO Base Media File Format (ISOBMFF) standard compliant file, the media data comprising a sequence of samples, including obtaining at least one sample of the sequence, generating ISOBMFF structure data indexing the at least one obtained sample, compressing the at least one obtained sample, and embedding the generated ISOBMFF structure data and the compressed at least one sample within the ISOBMFF compliant file.

15 Claims, 9 Drawing Sheets

(56) References Cited

U.S. PATENT DOCUMENTS

| | | | | |
|---|---|---|---|---|
| 2010/0049865 | A1* | 2/2010 | Hannuksela | H04N 21/6437 709/227 |
| 2010/0185854 | A1* | 7/2010 | Burns | G06F 12/1408 713/165 |
| 2012/0030706 | A1* | 2/2012 | Hulse | H04N 21/43615 725/38 |
| 2012/0185607 | A1* | 7/2012 | Rhyu | H04L 67/02 709/231 |
| 2012/0254332 | A1* | 10/2012 | Irvin | H04L 51/08 709/206 |
| 2013/0151770 | A1* | 6/2013 | Hara | G06F 3/065 711/E12.019 |
| 2013/0191550 | A1* | 7/2013 | Hannuksela | H04N 19/46 709/231 |
| 2015/0110473 | A1* | 4/2015 | Wang | H04N 19/597 386/341 |
| 2016/0234516 | A1 | 8/2016 | Hendry et al. | |
| 2016/0255381 | A1* | 9/2016 | Denoual | H04N 21/440245 709/231 |
| 2017/0171611 | A1* | 6/2017 | Nair | H04N 21/4408 |
| 2018/0077210 | A1* | 3/2018 | Hannuksela | H04L 65/60 |
| 2020/0275142 | A1* | 8/2020 | Bieber | H04N 21/4408 |
| 2021/0105492 | A1* | 4/2021 | Aksu | H04N 19/20 |
| 2021/0385454 | A1* | 12/2021 | Fleureau | H04N 19/124 |

FOREIGN PATENT DOCUMENTS

| | | |
|---|---|---|
| GB | 2602642 A | 7/2022 |
| GB | 2617048 A | 9/2023 |

* cited by examiner

METHODS AND DEVICES FOR IMPROVING STORAGE AND TRANSMISSION OF UNCOMPRESSED DATA WHILE USING A STANDARD FORMAT

CROSS REFERENCE TO RELATED PATENT

This application claims the benefit under 35 U.S.C. § 119(a)-(d) of United Kingdom Patent Application No. 2105488.7, filed on Apr. 16, 2021 and entitled "Methods and devices for improving storage and transmission of uncompressed data while using a standard format". The above cited patent application is incorporated herein by reference in its entirety.

FIELD OF THE DISCLOSURE

The present disclosure relates to the technical field of storage and/or transmission of uncompressed data, for example of video or images, while using a standard format such as the ISOBMFF format or any standard specification inheriting from ISOBMFF.

BACKGROUND OF THE DISCLOSURE

As commonly known, MPEG standards allow storage of compressed video sequences or images, based on a common basis format denoted the ISO Base Media File Format (or ISOBMFF). This is standardized by the International Standardization Organization as ISO/IEC 14496-12. Extensions of this standard, such as ISO/IEC 14496-15, define codec-specific storage formats, based on NAL (Network Abstraction Layer) units. Video codec specifications, such as AVC (ISO/IEC 14496-10), HEVC (ISO/IEC 23008-2), or VVC (ISO/IEC 23090-3), define types of NAL unit and payloads. In turn, the NALU-based File Format (ISO/IEC 14496-15) defines storage of these NAL units, so that any file format parser compliant with the NALU-based File Format can build a standardized bit-stream that is decodable by a video decoder conforming to the corresponding video codec, for example to AVC, HEVC, or VVC. According to these standards and specifications, the samples (a sample being, for example, an image) are indexed and described in the File Format tracks as compressed samples.

Each sample is described in the metadata part, also called structure-data, of the media file, in sample description boxes (the sample table box and its sub boxes and/or track run boxes in fragmented files). The data corresponding to a sample are stored in the media data part of the file, in media data boxes (e.g. 'mdat' or 'imda'). Indexation of the samples mainly consists in providing in the metadata part, or structure-data, of a media file, items of information for accessing sample data stored in the media data part of the file (being noted that this media data part may be in an external file, as permitted by the data reference box, or in the media file itself). Items of information for accessing samples may be sample position (e.g. a byte offset) in the media data box, its size, its timing information, etc.

The MPEG group is now considering defining a new standard (ISO/IEC 23001-17) to offer interoperability for the storage of uncompressed videos, without using NAL units and thus, without offering possibilities of using format-specific compression such as AVC, HEVC, or VVC. This MPEG standard for uncompressed video storage in ISO Base Media File Format would be based on ISOBMFF structure data, i.e. structured into boxes. It is observed that the new boxes proposed in the different embodiments of this disclosure may be part of the ISOBMFF if considered generic enough or may be part of the File Format for uncompressed video.

While such a new standard will offer many advantages in terms of compatibility and interoperability, the amount of data may lead to difficulties in terms of storage and transmission.

This means that, while it is important to preserve ISOBMFF features like genericity and wide support by media players as well as the possibility for temporal fragmentation or segmentation, for random access, and multiplexing of different media types (e.g. uncompressed video or image with compressed audio), there is a need to optimize handling of raw data to optimize storage and/or transmission of the data.

SUMMARY OF THE DISCLOSURE

The present disclosure has been devised to address one or more of the foregoing concerns.

In this context, there is provided a solution for improving storage or transfer of uncompressed data while using a standard format.

According to a first aspect of the disclosure, there is provided a method for encapsulating media data into an ISO Base Media File Format (ISOBMFF) standard compliant file, the media data comprising a sequence of samples, the method comprising:
  obtaining at least one sample of the sequence;
  generating ISOBMFF structure data indexing the at least one obtained sample;
  compressing the at least one obtained sample; and
  embedding the generated ISOBMFF structure data and the compressed at least one sample within the ISOBMFF compliant file.

Accordingly, the method of the disclosure makes it possible to store uncompressed data in an interoperable and efficient way and to preserve features of the standard used, for example to preserve ISOBMFF features such as random access, fragmentation, and data multiplexing, while offering some flexibility in the compression with various data block supports.

According to some embodiments, the at least one obtained sample is compressed using a generic (media agnostic or media independent) and lossless (at least visually lossless) compression.

According to some embodiments, the method further comprises obtaining at least one parameter of the compression and embedding the obtained at least one parameter within the ISOBMFF compliant file, the at least one parameter being stored in a dedicated ISOBMFF box, at the top-level of the ISOBMFF compliant file, or being stored within a sample description of the at least one obtained sample.

According to some embodiments, the at least one parameter comprises an identifier of a compression algorithm or the DEFLATE compression algorithm is used by default in case no compression algorithm is identified within the ISOBMFF compliant file.

According to some embodiments, the method further comprises defining a data block as a function of one or several samples, compressing the at least one obtained sample comprising compressing one or several samples according to the data block.

According to some embodiments, samples corresponding to several data blocks are stored within one or several media data ISOBMFF boxes.

According to some embodiments, the ISOBMFF compliant file comprises at least one first media data ISOBMFF box comprising the compressed at least one sample and at least one second media data ISOBMFF box comprising samples not compress with the lossless compression algorithm or the ISOBMFF compliant file comprises at least one first media data ISOBMFF box comprising the compressed at least one sample and comprising samples not compress with the lossless compression algorithm.

According to some embodiments, the method further comprises generating additional metadata, the additional metadata referencing, in the ISOBMFF compliant file, the compressed at least one sample.

According to some embodiments, the ISOBMFF compliant file comprises at least one top-level structure data box containing a brand parameter signaling compressed indexed samples in the ISOBMFF compliant file.

According to a second aspect of the disclosure, there is provided a method for generating displayable media data from an ISO Base Media File Format (ISOBMFF) standard compliant file generated by the method described above, the method for generating displayable media data comprising:

obtaining, from the ISOBMFF compliant file, at least one compressed sample;
decompressing the at least one obtained sample;
obtaining, from the ISOBMFF compliant file, ISOBMFF structure data indexing the decompressed at least one sample;
generating displayable media data as a function of the obtained ISOBMFF structure data and of the decompressed at least one obtained sample.

Accordingly, the method of the disclosure makes it possible to access uncompressed data stored in an interoperable and efficient way and to preserve features of the standard used, for example to preserve ISOBMFF features such as random access, fragmentation, and data multiplexing, while offering some flexibility in the compression with various data block supports.

According to some embodiments, the method further comprises obtaining at least one parameter of the decompression from the ISOBMFF compliant file, the at least one parameter being obtained from a dedicated ISOBMFF box at the top-level of the ISOBMFF compliant file or being stored within a sample description of the at least one obtained sample.

According to some embodiments, the at least one parameter comprises an identifier of a compression algorithm or the DEFLATE compression algorithm is used by default in case no compression algorithm is identified within the ISOBMFF compliant file.

According to some embodiments, the method further comprises defining a data block as a function of one or several samples, decompressing the at least one obtained compressed sample comprising decompressing one or several samples according to the data block.

According to some embodiments, the method further comprises obtaining additional metadata from the ISOBMFF compliant file, the additional metadata referencing, in the ISOBMFF compliant file, at least one compressed sample, obtaining the at least one compressed sample being based on the obtained additional metadata.

According to a third aspect of the disclosure, there is provided a method for encapsulating media data into an ISO Base Media File Format (ISOBMFF) standard compliant file, the media data comprising a sequence of samples, the method comprising:

obtaining a sample of the sequence of a predetermined type, indicating that the sample is uncompressed;
generating a sample description comprising the predetermined type;
compressing the obtained sample;
generating ISOBMFF structure data indexing the compressed sample;
adding to the sample description an item of information indicating the compression of the obtained sample; and
embedding the generated ISOBMFF structure data, the sample description, and the compressed sample within the ISOBMFF compliant file.

Accordingly, the method of the disclosure makes it possible to store uncompressed data in an interoperable and efficient way and to preserve features of the standard used, for example to preserve ISOBMFF features such as random access, fragmentation, and data multiplexing, while offering some flexibility in the compression with various data block supports.

According to some embodiments, the obtained sample is compressed using a generic (media agnostic or media independent) and lossless (at least visually lossless) compression.

According to some embodiments, the method further comprises obtaining at least one parameter of the compression and embedding the obtained at least one parameter within the ISOBMFF compliant file, the at least one parameter being stored in a dedicated ISOBMFF box, at the top-level of the ISOBMFF compliant file, or being stored within a sample description of the at least one obtained sample.

According to a fourth aspect of the disclosure, there is provided a method for generating displayable media data from an ISO Base Media File Format (ISOBMFF) standard compliant file generated by the method described above, the method for generating displayable media data comprising:

obtaining, from the ISOBMFF compliant file, ISOBMFF structure data indexing a compressed sample;
obtaining, from the ISOBMFF compliant file, a sample description comprising a sequence type and an item of information indicating that the indexed compressed sample is compressed;
obtaining the compressed sample indexed by the obtained ISOBMFF structure data;
decompressing the obtained compressed sample; and
generating displayable media data of the sequence type as a function of the obtained ISOBMFF structure data and of the decompressed obtained sample.

Accordingly, the method of the disclosure makes it possible to access uncompressed data stored in an interoperable and efficient way and to preserve features of the standard used, for example to preserve ISOBMFF features such as random access, fragmentation, and data multiplexing, while offering some flexibility in the compression with various data block supports.

According to some embodiments, the method further comprises obtaining, from the ISOBMFF compliant file, at least one parameter of the decompression, the at least one parameter being stored in a dedicated ISOBMFF box at the top-level of the ISOBMFF compliant file.

According to other aspects of the disclosure, there is provided a processing device comprising a processing unit configured for carrying out each step of the methods described above. The other aspects of the present disclosure have optional features and advantages similar to the first, second, third, and fourth above-mentioned aspects.

At least parts of the methods according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the present disclosure can be implemented in software, the present disclosure can be embodied as computer readable code for provision to a programmable apparatus on any suitable carrier medium. A suitable tangible carrier medium may comprise a storage medium such as a floppy disk, a CD-ROM, a hard disk drive, a magnetic tape device or a solid state memory device the like. A suitable transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the disclosure will become apparent from the following description of non-limiting exemplary embodiments, with reference to the appended drawings, in which.

DETAILED DESCRIPTION OF EMBODIMENTS OF THE DISCLOSURE

According to some embodiments of the disclosure, uncompressed data are stored or transmitted along with their description while using an a posteriori, non-destructive (lossless) compression of data blocks and conforming to a standard format such as ISOBMFF.

A data block is considered as a support for the compression, that is to say a compression unit. Accordingly, each data block is compressed individually (and then decompressed individually when used). Depending on configuration parameters, for example encapsulation configuration parameters, or depending on requirements of the applications requesting storage and/or transmission of the data, a data block may correspond to the data for an individual sample, for a chunk of samples, for a time range, for a movie fragment, for a segment, or even for a whole media file comprising the samples. In addition, the compression may be done per track or may be done simultaneously for one or more tracks (cross track compression). Likewise, the compression may affect only parts of the data (i.e. some data may come from a format-specific codec, meaning they are compressed before indexation and some data may be raw or uncompressed data that are compressed a posteriori, i.e. after their indexation, both in the same media data box or not).

Finally, the compression step may be parameterized, for example to select a compression algorithm, to select a size of the dictionary to be used for the compression, and/or to determine the required memory for decompression and/or whether the compression is optimized for speed or rather for compression efficiency. The compression algorithm is chosen among several widely used compression algorithms. For example, the well-known DEFLATE compression algorithm or a run-length encoding may be used. Other compression algorithms such as bzip2, Izma, or Brotli may also be used.

Accordingly, the data storage cost or the transmission cost may be reduced since a portion the uncompressed data is stored or transmitted as compressed while preserving file format features such as interoperability, random access, ability for streaming or progressive download, genericity and data multiplexing.

Figure 1:
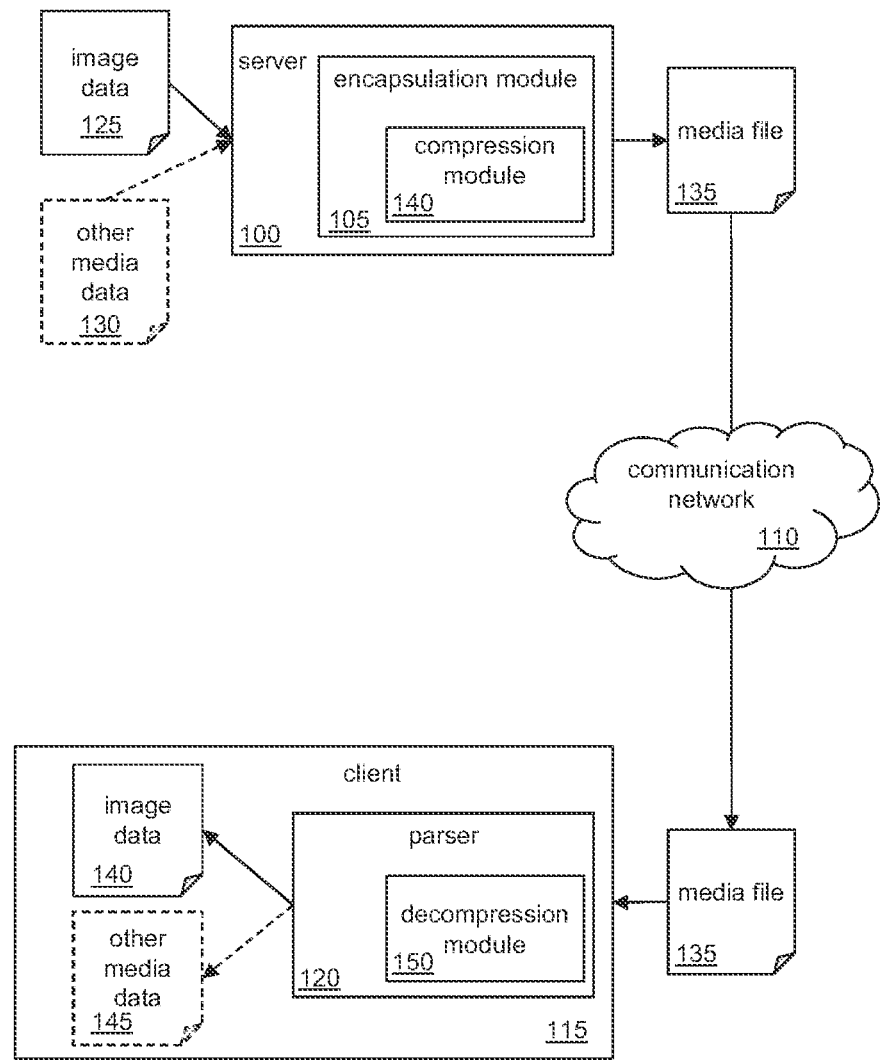
FIG. 1 schematically illustrates encapsulation and parsing of images or sequences of images to be transmitted, according to some embodiments of the disclosure.

FIG. 1 schematically illustrates encapsulation and parsing of images or sequences of images to be transmitted, according to some embodiments of the disclosure.

As illustrated, a server 100 comprises an encapsulation module 105. The server 100 may be connected, via a network interface (not represented), to a communication network 110 to which is also connected, via a network interface (not represented), a client 115 comprising a parser (or de-encapsulation module) 120 or a storage device (not represented).

According to the given example, server 100 processes data 125, for example video and/or sequence of image data, for streaming or for storage. Server 100 may also receive other media data 130, for example of the text or audio type and/or compressed video bit-streams, and/or metadata (not represented). These other media data and these metadata may be either in a compressed or in an uncompressed format, it being noted that some of these data may be in a compressed format and others may be in an uncompressed format.

For the sake of illustration, image data 125 may correspond to the recording of a scene by one or several cameras (or image sensors), referred to as a video source (i.e. a source of sequences of images), or correspond to the recording of images without temporal information, referred to as an image source (i.e. a source of individual images). Since image data 125 are uncompressed, they are also called raw data. Server 100 may index or describe the images of the video source into a media file 135 or into segment files (containing one or more segments), as they are processed. For the sake of clarity and unless specified otherwise, the images of a sequence of images are referred to as samples and individual images are referred to as items.

Server 100 may index or describe the images of an image source into a media file, for example into media file 135 as they are processed. The individual images of the image source are referred to as media data items or more precisely as image items, for example as defined in HEIF (High Efficiency Image Format, ISO/IEC 23008-12) standard.

According to some embodiments of the disclosure, a compression module referenced 140 applies a generic (media agnostic or media independent) and lossless (at least visually lossless) compression to image data 125 after they are indexed or described, when generating a media file 135 or when generating segment files. Such compression is preferably a commonly used lossless compression, for example a compression complying with the known DEFLATE compression algorithm (other examples of commonly used lossless compression algorithms are the bzip2, the lzma, and the Brotli compression algorithms). The compression algorithm used is a generic compression, i.e. format agnostic, in opposition to media-specific compression such as audio codecs (e.g. mp3 and AAC), video codecs (e.g. AVC, HEVC, and VVC), or image codecs (JPEG, JPEG-2000, HEVC . . . ).

An example of steps for compressing indexed samples is described by reference to FIG. 2.

The media file 135 or the generated segment files may be stored in a storage device or may be transmitted to a client, for example to client 115.

Client 115 may be configured to process data received from communication network 110, for example to process media file 135, or to process data read from a storage device. After the received or the read data have been parsed in parser 120 (also known as a de-encapsulation module or a reader, or even a player or a media player), the parsed data may be stored, displayed or output. According to the given example, the parser outputs the uncompressed video or images referenced 140, possibly with additional media data, such as media data 145, for example of the text or audio type and/or compressed video bit-streams, and/or metadata. These additional media data 145 form one or several bit-streams that may be displayed.

It is observed that some of the data of the received or read data, for example some data of media file 135, may be compressed data blocks, resulting from the compression of indexed samples, chunk of samples, time range, fragment, segment or data for the whole file. These data blocks require decompression before being accessed and extracted to be displayed.

An example of steps for decompressing indexed samples is described by reference to FIG. 3.

It is observed that server 100 and client 115 may be user devices but may also be network nodes acting on media files being transmitted or stored.

It is also noted that media file 135 or any other media file received or read by client 115 may be communicated to parser 120 in different ways. In particular, encapsulation module 105 may generate media file 135 with a media description (e.g. a DASH MPD, i.e. a media presentation description (MPD) of the dynamic adaptive streaming over HTTP (DASH) protocol) and communicate (or stream) it directly to parser 120 upon receiving a request from client 115. Media file 135 may also be downloaded, at once or progressively, by client 115 and stored locally.

For the sake of illustration, media file 135 may encapsulate media data (e.g. uncompressed or encoded video, possibly with additional media data) into boxes according to ISO Base Media File Format (ISOBMFF, ISO/IEC 14496-12).

In such a case, media file 135 may correspond to one or several media files or segments (indicated by a FileTypeBox 'ftyp' or a SegmentTypeBox 'styp'). According to ISOBMFF, media file 135 may include two kinds of boxes, one or several "media data boxes" (e.g. 'mdat' or 'imda'), containing the media data, and "metadata boxes" or "structure-data wrapper" (e.g. 'moov' or 'moof'), containing metadata defining the position of the media data in the media data box(es) and temporal position of the media data.

For example, the media data box(es) contain all the data for image data 125 and all the data for possible other media data 130. There may be one media data box multiplexing media data 130 and media data 125, for example compressed media data 130 and uncompressed media data 125. Alternatively, there may also be several media data boxes, for example a first set of media data boxes for the compressed media data and a second set of media data boxes for the uncompressed data.

New media data boxes may be created for specific storage of uncompressed data or for specific storage of compressed data and uncompressed data that are multiplexed in the same box.

According to some embodiments of the disclosure, the encapsulation comprises indexing uncompressed samples as data blocks and applying a posteriori a generic lossless compression on the indexed data blocks, as described by reference to FIG. 2. In a symmetrical way, processing the encapsulated data in a reader comprises decompressing data blocks and then parsing sample description to extract or access the samples, as described by reference to FIG. 3.

According to other embodiments of the disclosure, the encapsulation comprises a sample-based compression (i.e. a compression based on data blocks each corresponding to one sample) that is done before indexing the samples, as described by reference to FIG. 4. In a symmetrical way, processing the so-encapsulated data in a reader does not need decompression of samples before accessing each sample, as described by reference to FIG. 5.

Indexing Uncompressed Samples and Compressing Indexed Data Blocks

Figure 2:
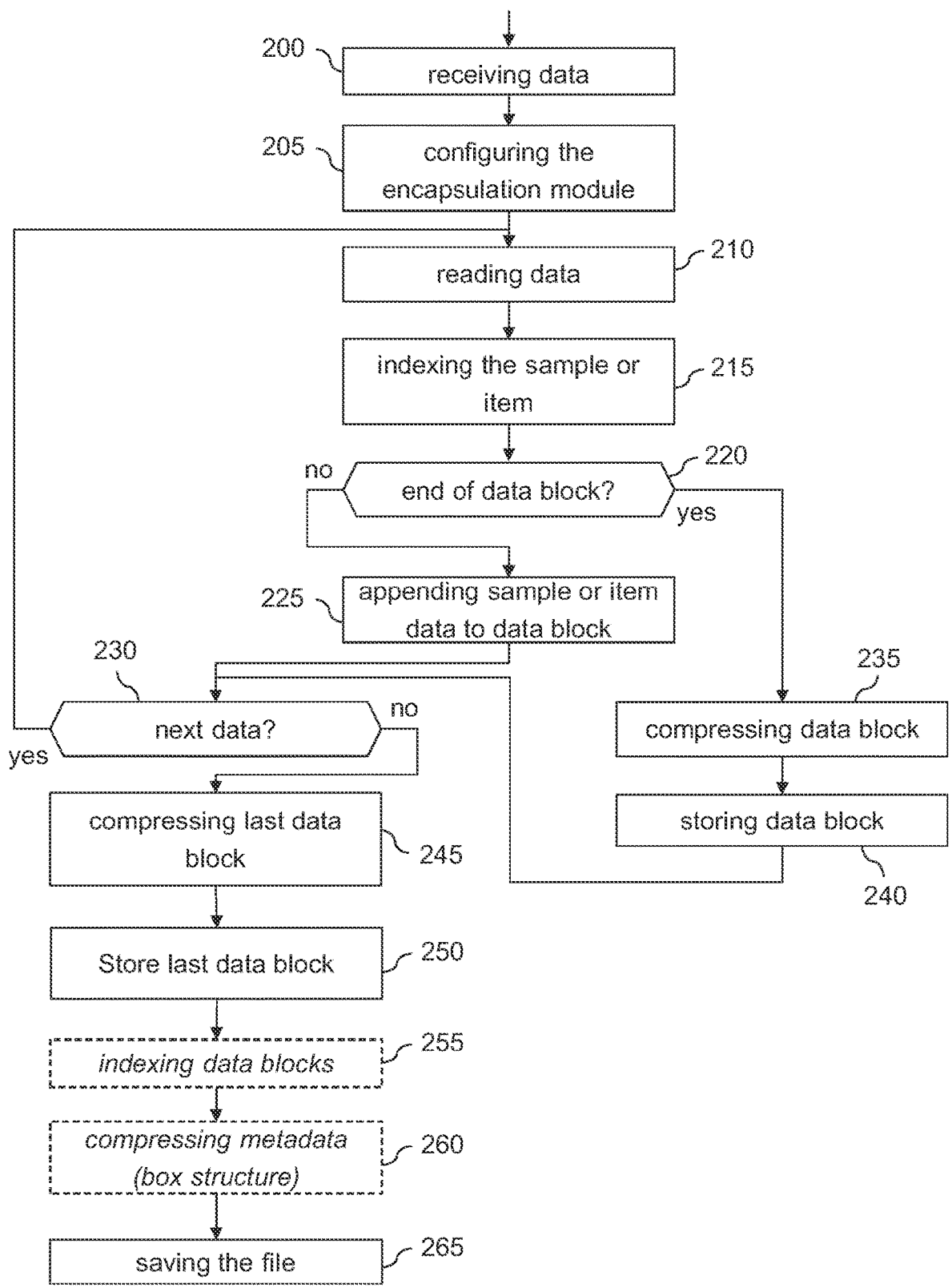
FIG. 2 illustrates an example of steps of an encapsulation process according to a first embodiment of the disclosure.

FIG. 2 illustrates an example of steps of an encapsulation process according to a first embodiment of the disclosure. Such steps may be carried out by the encapsulation module 105 in FIG. 1.

After having received data to encapsulate at step 200, for example image data 125 in FIG. 1, parameters of the encapsulation module are set during configuration or initialization step 205. Optionally, parameters of the compression module, for example compression module 140 in FIG. 1, may also be set during this step. For the sake of illustration, the compression algorithm to be used in the compression module may be set to the known DEFLATE algorithm (that can be set as a default compression algorithm). Alternatively, another compression algorithm may be selected from among widely supported generic compression algorithms such as LZW, bzip2, or LZ77, LZMA, and Brotli, that enables lossless compression of the received data to encapsulate, for example of image data 125. Likewise, the dictionary size may be configured to balance compression efficiency and memory requirements in players (compression may be configured to allow a fast compression and decompression or to optimize the compression ratio which is time and memory consuming).

The compression parameters may be added in the media file resulting from encapsulation, for example at step 205 (or at the end of encapsulation in 255) in a dedicated box at the top level of the media file or within the sample description. This box may be called, for example, CompressionInformationBox or GenericCompressionInfoBox identified by a specific four-character code (4CC). For example, the 4CC 'gcif' is reserved for identifying a box providing information on the compression configuration used by compression module 140 when encapsulating the file. On the parser or reader side, this information on the compression configuration may be used by the parser or reader to determine whether it can support the file or not (supported compression algorithm or not, enough memory resource or not, etc.).

A compression or generic compression information box may be specified as follows:

Box Type: 'gcif'
Container: MovieBox, TrackBox or MovieFragmentBox or TrackFragmentBox (for fragmented files) or Meta Box (for raw or uncompressed image items) or as one EntityGroup in the 'grpl' box
Mandatory: No
Quantity: Zero or one (per container)

This box contains parameters describing a generic compression applied onto data blocks stored in a media data boxes of a media file. Presence of this box in a sub box may override its definition in an upper level (this is for allowing a default definition at the top level of the file that may be overridden for some track or that may change from one fragment to another). However, preferably, the compression algorithm shall be the same across all instances of a given track for the parser or reader to determine at start-up (by parsing the 'moov' and 'trak' boxes) if it can support a track. This box may be empty then indicating that some data blocks may be present within some media data boxes, compressed using DEFLATE algorithm. An additional index box, called for example DataBlockIndex box or CompressedIndexBox, or a specific media data box itself may further describe the data blocks within media data part of the media file.

An example syntax for the GenericCompressionInfoBox (or CompressionInfoBox) may be:

```
aligned(8) class GenericCompressionInfoBox
    extends FullBox('gcif', version, flags) {
    uint(8)[16] compression_method; // default: 0X07deflate0x00
    unsigned int(8) compression_support; // optional
    unsigned int(16) memory_requirement; // may be flags-
controlled
    unsigned int(8) compression_ratio; // optional
    if (compression_support == 12) // arbitrary number of bytes
        unsigned int(16) data_block_length; // optional
    }
    // other optional parameters describing the compression
    }
}
``` wherein
compression_method is a name, for informative purposes. It is formatted in a fixed 16-byte field, with the first byte set to the number of bytes to be displayed, followed by that number of bytes of displayable data encoded using UTF-8, and then padding to complete 16 bytes total (including the size byte). The field may be set to 0. When set to 0, the DEFLATE algorithm may be used by default by the parser or reader. In a variant, this parameter could be an integer whose value indicates an algorithm among a list of pre-defined and allowable algorithms, for example as codec independent code points. As an example, a code point with value 0 would correspond to the DEFLATE algorithm, a code point with value 1 would indicate a bzip2 algorithm, etc,
compression_support (or compression_unit) is an unsigned integer whose value indicates the mapping of data blocks. When not present, data block is deduced from the box structure and from the container box, i.e. a data block corresponds to the whole data for the container box. For example, data block corresponds to the whole data of the file when present in 'moov' box; data block corresponds to data for all track fragments when present in a 'moof' box, data block corresponds to data for a whole track when present in a TrackBox or data block corresponds to data for a whole track fragment when present in a TrackFragmentBox or data block corresponds to the data for image items containing this box in their ItemInformationEntry when present in a 'meta' box at top level of the file. When present, this parameter may take the following values (these values are given only as examples, a subset of these values may be used, a different order may be used, a subset may be defined depending on the container box, for example a set of values for distinction between tracks and image items):

0: a data block corresponds to the data of a sample,
1: a data block corresponds to the data of a chunk or a run of contiguous samples,
2: a data block corresponds to the data of samples of one track or one track fragment within a time range,
3: a data block corresponds to the data of samples of a set of tracks or a set of track fragments within a time range. This may require that chunks or runs of samples are time aligned across the set of tracks or track fragments,
4: a data block corresponds to the data of a whole movie fragment,
5: a data block corresponds to the data of a whole segment, i.e. of one or more movie fragments,
6: a data block corresponds to the data of all the samples of a track or of a set of tracks. It is noted that the set of tracks compressed together may be declared in a specific entity group or track group,
7: a data block corresponds to the data of the whole file,
8: a data block corresponds to the data of one image item,
9: a data block corresponds to the data of a set of contiguous items in the media data,
10: a data block corresponds to the data of a set of contiguous items extents in the media data,
11: a data block corresponds to the data of input image items used in the same derivation (referenced by a 'dimg' reference type from the same image item, for example in a grid or overlay derived item), and
12: a data block corresponds to an arbitrary number of contiguous bytes in a media data box, this number being provided in the data_block_length parameter, memory_requirement is an unsigned integer providing, in megabytes, the required memory size to perform the decompression of data blocks corresponding to the contained box. Ideally, the worst case is indicated here for the reader to check if it has sufficient resource. When set to 0, or not present, no information is available. It is recommended that this value is set when the memory requirement exceeds tens of mega bytes. In a variant, it may use 32 bits and provides the memory requirement in kilobytes. Optionally, the presence of the memory_requirement parameter may be controlled by one flags value (not represented in the above syntax) indicating whether the compression has been optimized for speed or rather for storage. In the latter case, the memory requirement may be present while not present in the former. The flags value may be defined as follows: 0x000001 compression_optimized_for_storage indicates that the compression was optimized for storage rather than speed and may put higher memory and processing requirements on reader. Of course, the flags value may be defined the opposite way, indicating that the compression was optimized for speed and when set the memory_requirement is not present in the 'gcif' box, compression_ratio is an unsigned integer providing the best (or almost the best) compression ratio for the data blocks corresponding to the container box (this can help the parser or reader in allocating memory for decompressed data blocks, providing a an upper bound for buffer size). Only values between 0 to 99 are authorized, others are reserved. Alternatively, it can provide an average compression ratio for the data blocks corresponding to the container box, data_block_length parameter is an unsigned integer indicating, when compression_support is set to the value indicating a number of contiguous bytes (e.g. 12) in a media data box, the number of bytes to consider for the compression. This allows the parser or reader to process data blocks one after the other in parallel to the sample parsing: some decompressed samples for a data block N become available and can be parsed, while the data block N+1 is decompressed in parallel. This parameter is not present when compression_support is not set to the value indicating a number of contiguous bytes in a media data box. Alternatively, some specific compressed data box may provide this data_block_length, thus avoiding this parameter to be declared in the compression information box.

Configuration or initialization step 205 comprises setting up encapsulation parameters, for example the following parameters: segmentation, fragmentation aspects, whether data will be multiplexed or not, single track or multi-track encapsulation, and/or the number of tracks depending on the input 125 and/or 130. When input data 125 correspond to a source image, the configuration consists in initializing metadata boxes for image items, including their type, location or properties, etc. It is noted that the encapsulation configuration impacts the compression module, in particular in terms of compression_unit. For example, when segmentation or fragmentation is in use, applying compression at segment or fragment level is relevant: it does not introduce too much delay and it preserves random access, for example at segment or fragment boundaries or on samples described as 'sync', 'sap' or 'rap' or 'edrp' sample groups. Having compression applied at segment level guarantees that once a data block is decompressed, the 'sidx' and information indexing the segment is usable. This may avoid including an index for the compressed data blocks, or at least make it simpler, sidx providing location of the movie fragments and an additional index (e.g. DataBlockIndex box or CompressedIndexBox) indicating where are the data blocks within media data part of the movie fragment. The compression unit may be setup explicitly during the configuration or initialization step 205 or it may be determined from other configuration parameters, for example from the encapsulation parameters.

After having configured or initialized the encapsulation module and optionally the compression module, the encapsulation module reads data in step 210 that is indexed as a sample or as an item in step 215.

For example, if the data read in step 210 corresponds to an image of an image sequence, this image may be encapsulated as a sample of a track. Its position in the media data box, its size and its timing information are stored in sample description boxes (Sample Table Box 'stbl' and its sub-boxes), for example in the ISOBMFF boxes SampleToChunkBox ('stsc') and ChunkOffsetBox ('stco'), SampleSizeBox ('stsz'), TimeToSampleBox ('stts') or CompositionOffsetBox ('ctts') respectively. If the data read in step 210 is an individual image, it may be stored as an item described in a MetaBox 'meta', e.g. as an image item, including the description (or indexation) of its position in the media data box and its size described by an ItemLocationBox. More generally, when the input data comes from a media sequence with timing information, it is encapsulated as a sample in a track. When the input data read at step 210 has no associated timing, it is rather stored as an item in the MetaBox of the file. The media handler of the track indicates the media type of the sample. Likewise, the item_type of an item in ItemInfoEntry ('infe') provides its media type.

After having indexed the read sample, a test is carried out to determine whether the read sample corresponds to the end of a data block (step 220). This depends on the compression unit selected or determined during the configuration step. The compression unit may be a data block corresponding to a sample, to a chunk of samples, to samples within a time range in a given track, to samples within a time range for several tracks, to a run of samples within a fragment, to samples of fragments, to samples of a segment, or to samples for the whole file. Once configured, this compression_unit may be stored in a compression information box like the compression_support (or compression_unit) parameter of the 'gcif' box described above. Alternatively, it may be implicitly deduced from the metadata structure or encapsulation configuration. The choice of the compression unit is described in more detail in reference to FIG. 6 and FIG. 7. If the read sample (i.e. the current processed sample) does not correspond to the end of the data block, then the data for the current sample is buffered into the current data block at step 225 and a test is carried out to determine whether a next sample is available (step 230). If a next sample is available, it is read and processed, the encapsulation module iterating on samples until the end of the data block is reached.

If the read sample corresponds to the end of a data block, a generic compression (for example the DEFLATE algorithm by default) is applied to the current data block at step 235. Next, the compressed data block is stored in a media data box at step 240. The choice of using a single media data box or of using dedicated media data boxes is described in more detail by reference to FIG. 6 and FIG. 7. Next, a test is carried out to determine whether a next sample is available (step 230). If a next sample is available, it is read and processed, the encapsulation module iterating on samples until the end of the data block is reached as described above.

When it is determined that all the samples of the read data have been processed, the last data block may be compressed (step 245) and stored (step 250) if the end of the data block was not reached when processing the last read sample.

Optionally, additional indexes (e.g. DataBlockIndexBox or CompressedIndexBox) are added in the media file to describe entry points to compressed data blocks (step 255). When present, these indexes indicate the compression unit (sample, chunk of samples, fragment, etc.) as well as byte offsets in a media data box indicating the position of a data block. There may be one additional index per media data box containing (exclusively or mixed with samples) compressed data blocks. It may provide the compression parameters. The additional indexes may not be present in the file when media data boxes providing identifiers are in use (this is described in more detail by reference to FIG. 6 and FIG. 7).

The additional index may be defined as a new box, for example DataBlockIndex box or CompressedIndexBox, respectively identified by 'dbix' or "cidx" four-character code. Whatever the name or four-character code, the additional index providing access to data blocks may be defined as follows:

Box Type: 'cidx' (or 'dbix')
Container: File or Segment
Mandatory: No
Quantity: Zero or more A data block index or compressed index box provides byte offsets for the data blocks stored in a media file or in a segment file. The offset may be computed from the start of the media file or segment file. Alternatively, it may be computed from the first byte of the media data box when only one is present. There may be as many data block indexes as there are media data box storing data blocks. In this case, the data block index may contain a media data box identifier to precise which media data box it describes. Optionally, for verification purpose and reliability, the data block index may contain the original offset of the first byte of the data block as well as its original size (as indicated in the sample description boxes). The verification mode may be controlled by a version number (as illustrated in the CompressedIndexBox below) or by a flag value (not illustrated). Optionally this index contains a time to compressed data block mapping to facilitate random access.

```
aligned(8) class CompressedIndexBox extends FullBox('cidx',
    version, flags) {
    unsigned int[32] data_block_number;
    for (int i=0; i< data_block_number; i++) {
        unsigned int[32] data_block_offset;
        unsigned int[32] data_block_length;
        unsigned int[32] media_data_box_identifier; //optional
    }
    if (version == 1) {
        for (int i=0; i< data_block_number; i++) {
            unsigned int[32] original offset;
            unsigned int[32] original size;
        }
    }
    if (flags == value for time_indexing) {
        for (int i=0; i< data_block_number; i++) {
            unsigned int[32] time_offset;
            unsigned int[32] data_block_index;
        }
    }
}
``` data_block_number indicates the number of data blocks described in this box, data_block_offset indicates the byte offset to locate the first byte of the compressed data block in the file or in segment file. Depending on, for example a flags value, the offset is file or segment based or media data box based. When the offset is media data box based, an identifier of the media data box may be specified in this box. Alternatively, a byte offset to the first byte of the media data box may be provided, data_block_length indicates the length in bytes for the compressed data block. (In some configurations, for example when an identifier of media data box is provided in the box, and that this box only contains compressed data blocks, only one of the data_block_offset or data_block_length may be specified in the box), media_data_box_identifier indicates the identifier of a media data box containing the data blocks described in this box. Alternatively, and to support media data boxes without identifier, the media data box may be provided as a byte offset to the first byte of the media data box containing the compressed data block, original offset indicates the byte position of a compressed data block as stored in the sample description boxes or in an item location box ('iloc'), and original size indicates the length, in bytes, of a compressed data block, as can be deduced from sample or item description, possibly in combination with the compression unit in the CompressionInformationBox (or with the encapsulation configuration).

These two original parameters may be used at the parser or reader side either for accessing a data block based on sample or item description, by matching the offsets, or after decompression for the parser or reader to compute offsets and sizes after decompression and to check against sample or item description that obtained offsets and sizes correspond to the sample or item description.

Optionally, the data block index may contain time to compressed data block mapping. This may be indicated by a flags value of the box, for example value 0x000020 that, when set, indicates that the box contains a time to compressed data block mapping.

time_offset indicates a time reference in the presentation (for example a composition time or decoding time as respectively described in 'ctts' or 'stts'), and data_block_index indicates the index of a compressed data block in the list of compressed data block described in this box.

Turning back to FIG. 2 and following the optional indexing step, another optional step may be carried out to compress the metadata boxes (step 260), using the DEFLATE algorithm as suggested in ISOBMFF. When the compression module is configured with compression algorithm different from DEFLATE, this same algorithm may be used for the compression of the metadata boxes.

Finally, the encapsulated media file, for example encapsulated media file 135 in FIG. 1, is stored in step 265. It is to be noted that when a data block corresponds to a fragment or segment, the storage may occur right after the storage of the compressed data block in step 240 (as well as for optional step 255 or 260).

When the media file is stored, the 'ftyp' box (or 'styp' box for segments) contains a brand indicating that the media file contains data that have been compressed after being indexed. This brand may be the existing brand 'isoc' for compressed boxes that is extended to also allow the compression of the 'mdat' box(es). Alternatively, it may be a new brand value indicating a posteriori compression of some data independently of compression of the metadata boxes.

For the sake of clarity, the compression configuration has been described in relation with the configuration or initialization step 205, at the beginning of the process. However, it is noted that it could be reconsidered from one data block to another, for example after step 230 to provide a dynamic or varying compression mode over time. For example, advanced encapsulation modules may evaluate different compression configurations (algorithm, mode, dictionary size, etc.), and finally select the most efficient one in terms of compression for a given fragment or segment for example. Thus, the compression configuration would be provided at a fragment or segment level.

The configuration may, alternatively to fragments or segments, be reconsidered for varying on time intervals. There may be several compression configurations used in a media file, for example one per track containing uncompressed video, or one for still images and one for uncompressed video in media file containing both still and moving images. Likewise, there may be different compression configuration if the media file encapsulates uncompressed video or image with other media types that are compressed a posteriori, i.e. after being indexed. When several compression configurations are used in a file, top level information in the file may indicate the configuration with highest requirements for the players (e.g. required memory for decompression). For the sake of clarity, the steps illustrated in FIG. 2 split the reading of a data block, its compression, and its storage. However, these three different stages may also be realized in streaming, where each sample from a data block is compressed, or at least feed to the compression algorithm, as soon as it is read, and where each part of the output of the compression algorithm is stored inside a data block as soon as it is obtained.

Possibly, the compression algorithm used is a block compression algorithm such as bgzip. With bgzip, data are compressed into a series of small (less than 64K) 'BGZF' blocks. This allows indexes to be built against the compressed file and used to retrieve portions of the data without having to decompress the entire file. In this case, in the steps illustrated in FIG. 2, the limit of a data block is determined by the size of the compressed block produced by the algorithm. This size may be specified during the configuration step 205. It may also be included in the compression information box as an additional parameter. Step 220 checks whether the end of a data block has been reached by checking the size of the accumulated data. If enough data have been read, then the data block is compressed at step 235. The size of the data block may need to match exactly the compression block size. In this case, the data in excess are not put into the data block at step 220 but are kept to be included in the next data block.

At step 255, the indexing of data blocks may correspond to matching the positions of the compressed data blocks to the corresponding positions inside the uncompressed data. This matching may take advantage from the fact that all uncompressed data blocks have the same size, that is the compression block size.

Possibly, the compression algorithm uses a common dictionary for all data blocks. This common dictionary may be built for example by compressing the first data block and using the resulting dictionary, or by compressing a predetermined part of the first data block and using the resulting dictionary. This common dictionary may be reconstructed on the parser or reader side by decoding the first data block or a pre-determined part of the first data block or using a number of bytes corresponding to the data_block_length parameter, when present, of the compression information box. The part of the data used to build the dictionary may be specified in the configuration step 205. This may be the first data block, a given size of the first data block, several data blocks, etc. The part of the data used to build the dictionary may be encoded as part of the metadata when indexing the data blocks at step 255, for example in the compression information box as a number of bytes that have been indexed or may reuse the data_block_length when present. Possibly, each data block may contain a reference indicating the data block used to build the common dictionary. Possibly, this information may also be encoded as part of the metadata at step 260.

At step 235, before encoding the first data block, the common dictionary is built and stored. Preferably, this common dictionary is built while encoding the first data block. Before encoding another data block, the common dictionary is retrieved to initialize the compression algorithm. For segmented files, the common dictionary may be stored at the beginning of the segment to guarantee random access in files containing common dictionary updated along time. As well for fragmented files, the dictionary may be updated from one movie fragment to another.

Figure 3:
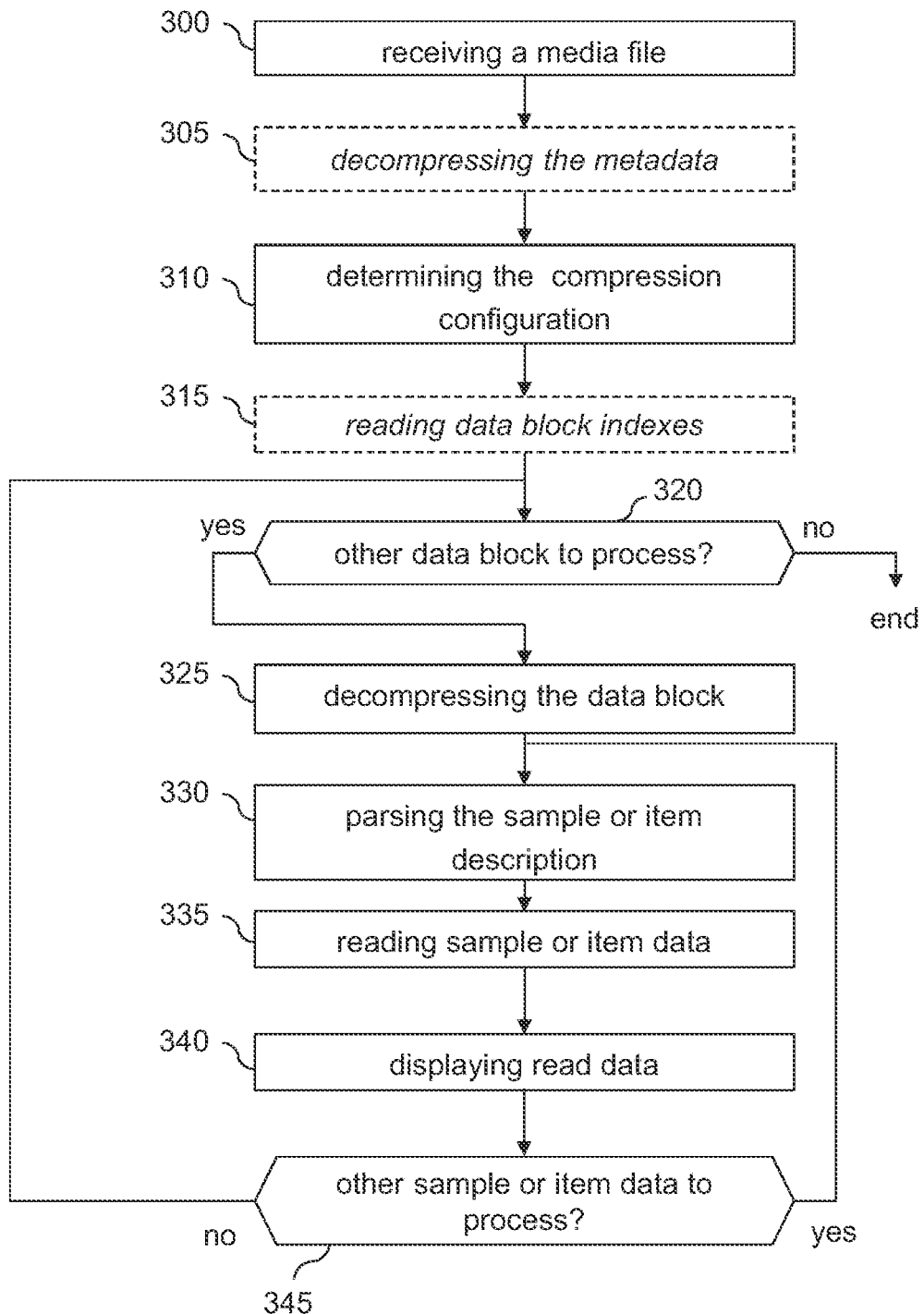
FIG. 3 illustrates an example of steps of a parsing process according to a first embodiment of the disclosure.

FIG. 3 illustrates an example of steps of a parsing or reading process according to a first embodiment of the disclosure. Such steps may be carried out by the parser 120 in FIG. 1.

According to the illustrated example, the parsing or reading process begins by receiving a media file or segment files during step 300, for example media file 135, that have been generated according to embodiments of the disclosure, for example according to the steps described in reference to FIG. 2. Receiving such a media file or segment files may comprise downloading, copying, or streaming (or progressively transmitting) the media file or segment files.

Next, the parser or reader and its decompression module are configured during step 310. For the sake of illustration, such a step may comprise a step of reading the MovieBox 'moov' from the received media file or from the initialization segment when the media file consists in one or more segment files.

As illustrated, if the metadata are compressed, it is required to decompress the metadata (step 305) before configuring the parser or reader and its decompression module. Determining whether the metadata are compressed may be based on an indication within the brand 'isoc' of the media file or by detecting the presence of a CompressedMovieBox ('!mov'). The brand, through a specific value, may also indicate that some data may require a priori decompression before access to or extraction of sample data can be made from the sample description.

Configuration step 310 allows the reader or parser to allocate memory to store reconstructed images and memory for decompression of data blocks. This parameter relating to the memory size for decompression of data blocks may be read from a specific box providing compression parameters, for example a CompressionInformationBox. If no specific brand indicating a priori decompression is present, for example in the 'ftyp', 'styp' or in compatible brands, this information may be obtained from the box structure received with the media file during step 300 or may be obtained after decompressing the metadata during step 305.

For the sake of illustration, the parser may inspect the kind of media data box(es) that are used or may look for a specific box describing a generic compression applied to some data of the file or for a specific index box providing information on compressed data blocks. When such top-level information is found by the parser, the parser is configured in a specific mode where decompression is performed on data blocks before accessing or extraction sample data as indexed in the sample description.

When one or several indexes provide the positions of compressed data blocks in a metadata part of the file, they are read during optional step 315. These indexes enable the parser or reader to determine how compressed data blocks are mapped within the media file structures (e.g. samples, chunk of samples, time range, fragment or segment or whole file).

Next, parsing of the media data begins by determining that there is a data block to process (step 320), that may correspond to the first data block or to a following data block identified according to a given time offset. As illustrated, if there is no data block to process, for example because the end of the media file has been reached, the parsing process ends. On the contrary, if there is a data block to process, the parser reads this data block and applies the generic decompression to the read data block during step 325. As described above, the generic decompression is set by default or defined during configuration of the decompression module.

The decompressed data block is stored in memory of the parser and the sample or item description is parsed during step 330. It is noted that by parsing the metadata part of the file, still during step 330, the parser can get information to access a specific sample or item in the decompressed data block. Next, the sample or item data are read during step 335 and displayed during step 340.

Next, a test is carried out to determine whether there is a next sample or item in the decompressed data block (step 345). If there is a next sample or item in the decompressed data block, the parser iterates on the parsing of the sample or item description, for example to get the sample or item size, to be able to extract the data for this next sample or item from the buffer containing the decompressed data block. Sample or item data is then read and displayed during steps 335 and 340. This is iterated until the last sample or item in the current data block is reached (i.e. until test 345 is false), or if there is a seek operation to access samples or a selection of another item that do not fall in the current data block.

When the last sample or item of the current decompressed data block is reached or a seek operation requiring another data block is detected, the parser loops to step 320 to determine whether there is a next data block to process. If there is another data block to process, steps 325 to 345 are repeated until the end of the media file is reached or until a stop instruction is received.

When the compression algorithm used is a block compression algorithm such as bgzip, the indexing of data blocks may be read at step 315. This indexing enables the parser to locate which compressed data blocks contain data associated to a given sample, chunk of samples, time range, fragment or segment or whole file. This indexing allows decompressing only the part of the compressed data corresponding to a sample, chunk of samples, time range, fragment or segment or whole file. Possibly, some additional data may be decompressed as the boundaries of the compression blocks may not match the boundaries of the sample, chunk of samples, time range, fragment or segment or whole file.

In this case, before step 335, a new testing step is introduced to verify whether the last decompressed data block contains all the data for the sample to read. If this is not the case, the next step is step 325 to decompress another data block.

When the compression algorithm uses a common dictionary for all data blocks, it may be retrieved by the parser when decoding the metadata, for example the compression information box, at step 310. At step 325, after decompressing the first data block, the common dictionary is built and stored. Preferably, this common dictionary is built while decoding the first data block. Before decompressing another data block, the common dictionary is retrieved to initialize the decompression algorithm.

Possibly, the common dictionary may change regularly, for example at given time intervals, for each fragment, or for each segment.

Compressing and Indexing Sample

Figure 4:
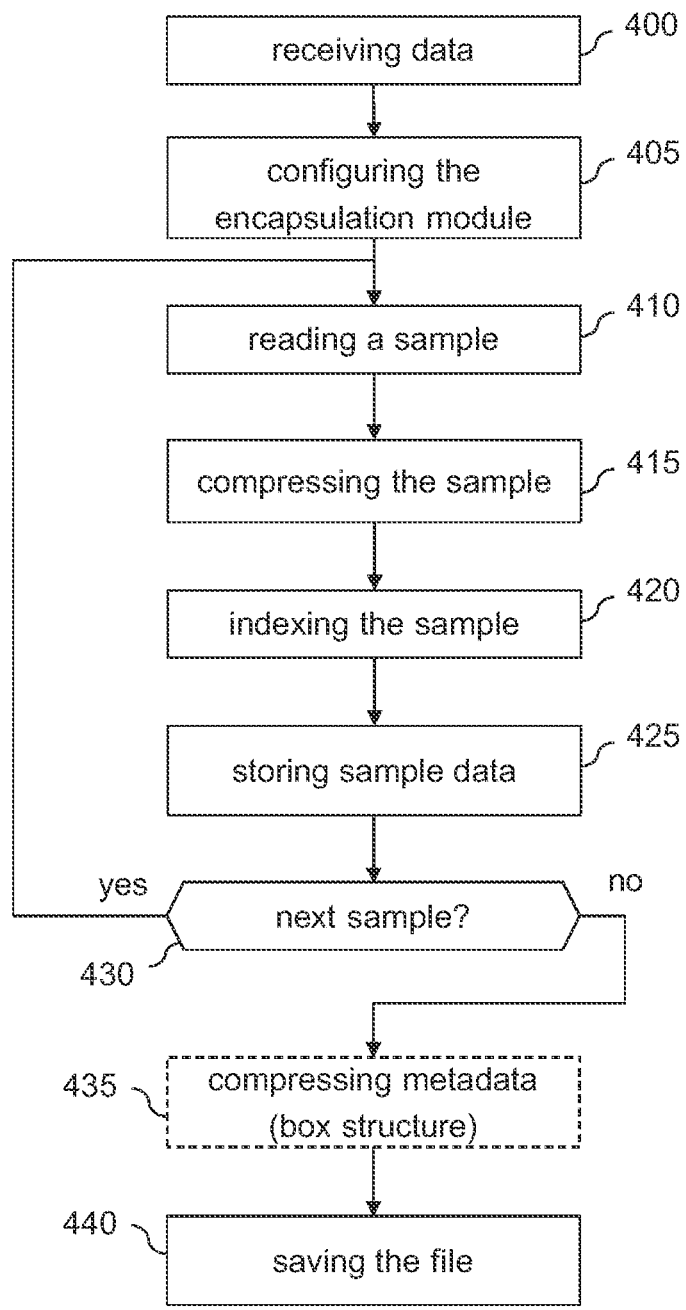
FIG. 4 illustrates an example of steps of an encapsulation process according to a second embodiment of the disclosure.

FIG. 4 illustrates an example of steps of an encapsulation process according to a second embodiment of the disclosure. According to this embodiment, the support for the generic compression is a sample. This is a particular case of data block since the compression unit matches the indexation granularity, i.e. the sample. The illustrated steps may be carried out in an encapsulation module, for example encapsulation module 105 in FIG. 1.

According to the illustrated example, the encapsulation module to be used is configured (step 405) after having received uncompressed or raw data in step 400. Such a configuration step may comprise setting encapsulation options such as setting parameters indicating whether the file is fragmented or not, whether there is single file or segments, whether there is a single media data box or several, whether the data are multiplexed if other media data (such as media data 130 in FIG. 1) are to be encapsulated in the same file, etc. The settings may be set by a user through a graphical user interface or through a command line. Alternatively, these settings may be hard-coded in the server wherein the media data are encapsulated. According to some embodiments, configuration of the encapsulation module comprises configuration of the compression module such as compression module 140 in FIG. 1, for example as described in reference to step 205 in FIG. 2.

During its configuration, the encapsulation module initializes the file with the top-level metadata boxes, for example the following metadata boxes when ISBMFF is used: FileTypeBox ('ftyp') or SegmentTypeBox ('styp') (for segments), MovieBox ('moov') and optionally MovieFragmentBox ('moof') if the media file is configured for fragmentation. The 'ftyp' or 'styp' box may contain a brand value indicating that one or several generic compression algorithms are used for the storage of samples data (either as major_brand or in the list of compatible brands). Optionally a CompressionInformationBox may further detail the compression parameters such as a reference of the compression algorithm to be used, a size of dictionary to be used for compression, memory requirements making it possible to improve compression speed or compression efficiency, etc.

Preferably, a box for sample description is used for indication about the processing for the storage of the uncompressed data samples. For the sake of illustration, if it is considered that the data to be encapsulated (i.e. the data read in step 400) correspond to individual images, the item information entry may be used. Accordingly, a specific four-character code (4cc) is defined and reserved for indicating that samples or items correspond to uncompressed image data. For example, the four-character code 'ucmp' (for "uncompressed" data), "ucpi" (for "uncompressed image" data), 'uncv' for "uncompressed video", or "iraw" (for "Image Raw" data) may be defined (being noted that additional media data such as media data 130 in FIG. 1, that may be compressed with a format-specific compression algorithm would use a specific sample entry such as 'avc1', 'hvc1' or 'hev1', 'vvc1', etc.). This four-character code for uncompressed data can be used as a specific VisualSampleEntry to describe sample entry type for uncompressed video samples. Additional parameters within this specific visual sample entry can further describe the samples, for instance a content_encoding parameter may provide the type of generic compression applied to data stored in samples (e.g. "gzip", "compress" or "deflate"). In addition, other compression parameters may also be defined in the VisualSampleEntry providing detailed characteristics of the compression method when the samples are compressed by using a generic compression algorithm (algorithm, dictionary size, memory requirements, optimized for speed or for compaction). Having a generic sample entry type ('ucmp' or 'ucpi') on the one hand and a parameter indicating generic compression or not on the other hand, allows to support storage of uncompressed samples in a unified way, whatever their pixel configuration and whether compression is applied or not. Indicating a generic compression or not in the sample entry would require definition of many sample entries: two sample entry types per media type of sample that may be compressed: for example, uncompressed video samples generically compressed or not compressed, metadata sample generically compressed or not, etc. Moreover, the sample entry type for uncompressed video or image can be used in the codecs parameter for the MIME type of the file. As such, the file is seen mainly as media file containing uncompressed video (or image), the fact that compression is applied or not may come as additional parameter, through a brand or an additional parameter as explained later in this description.

Similarly, the same four-character code can be used as an item_type value in an ItemInfoEntry box to indicate that an image item is an uncompressed image. The content_encoding parameter of the item info entry may be used to indicate whether the uncompressed image is stored after a generic compression is applied (as done here in step 415) or not. Alternatively, or in addition to the content_encoding parameter, a CompressionInformationBox may further detail the compression parameters as detailed in reference to FIG. 2. The CompressionInformationBox may be contained in the ItemInfoEntry ('infe'), possibly a new version of the 'infe' box or eventually controlled by the content_encoding parameter. In a variant, the parameters for compression information may be represented by a CompressionInformationProperty associated with the uncompressed image item that is compressed before indexation and storage. The payload may be the same as the CompressionInformationBox, possibly with a reduced set of values for the compression_support (or compression_unit) parameter. The set of values related to items may only be kept for the image property.

After being configured, the encapsulation module may begin reading sample data (step 410). Next, the read sample data are compressed during step 415 by using the lossless generic compression algorithm selected during the configuration of the encapsulation module. The DEFLATE algorithm may be selected by default. The size of the compressed sample data is used to describe the sample or item in case of an individual image. Next, the sample is indexed in sample description boxes providing temporal position, byte offsets, and size of the current sample (step 420).

In case of image items, an item location box may be inserted in the media file providing the item byte offset and length during step 420. The obtained compressed data are then appended to a media data box (e.g. 'mdat' or 'imda' box) in step 425.

Next a test is performed to check whether there is a next sample to process (step 430). If there is a next sample to process, the algorithm loops on step 410 to process the next sample. Otherwise, the metadata describing the media data (i.e. the box structure) may be compressed to save more storage space (step 435). Finally, the media file is saved (step 440) for storage and/or transmission. The obtained media file 135 may be stored as one single file or as multiple segment files.

In a variant to the content_encoding parameter or to the CompressionInformationBox in the description of uncompressed video data encapsulated after a generic compression, a restricted sample entry may be used (e.g. 'resv' sample entry type). A RestrictedSchemeInfoBox ('rinf') is added to the sample description, leaving all other boxes unmodified and the original sample entry type (e.g. 'ucmp' or 'ucpi') is stored within an OriginalFormatBox contained in the RestrictedSchemeInfoBox. A specific scheme type (e.g. a 4cc 'gcmp' for generic compression, also denoted CompressionSchemeType) is defined to indicate, when it is used as a value for the scheme_type parameter in a SchemeTypeBox ('schm') of a restricted sample entry, that a generic compression has been applied to samples corresponding to the input data 125. The scheme_type parameter of this 'schm' box may be set to a specific four-character code indicating a generic compression or the four-character code defined for the compression information box (e.g. 'gcif'). In addition, a dedicated CompressionInformationBox, as defined in reference to FIG. 2, may be defined in a SchemeInformationBox of the RestrictedSchemeInfoBox of the restricted sample entry to provide specific parameters of the generic compression applied to data blocks (algorithm, dictionary size, memory requirements, etc.). The compression_support parameter of the compression information box should be set to 0, meaning that data block corresponds to a sample. Reader shall then decompress each sample individually. When the compression information box (e.g. 'gcif') is present but empty or when no compression information box is present in the SchemeInformationBox ('schi') or when there is no SchemeInformationBox ('schi') and the scheme_type in the RestrictedSchemeInfoBox ('rinf') indicates a generic compression, then the reader may assume a deflate decompression on a sample basis at step 505. When the encapsulation module uses a restricted sample entry with this specific scheme, it is an indication for parsers or readers that a decompression step (the DEFLATE algorithm by default in step 530) is required before outputting the uncompressed video data.

In a variant to the use of a restricted sample entry, another specific sample entry type is used to indicate some pre-decoding instructions before outputting the data 140 (e.g. for displaying or rendering the media data). Indeed, the 'resv' sample entry rather indicates post-decoder operations while here it is rather a pre decoder operation that is expected (step 530 preceding step 535) to be performed by the parser 120. The samples may be "hidden" behind a generic sample entry, e.g. 'comp', indicating compressed data (generic compression or format-agnostic, different than a format-specific compression that defines its own sample entry types). This specific sample entry may be used for any kind of uncompressed media data that is encapsulated following a generic compression. This sample entry contains a CompressionSchemeInfoBox that itself contains an OriginalFormatBox indicating the sample entry type for the uncompressed media samples:

```
SampleEntry('comp') {
    CompressionSchemeInfoBox {
        OriginalFormatBox; // e.g. 'uncmp'
        SchemeTypeBox; // optional
        SchemeInformationBox; // optionally containing a 'gcif'
    box
    }
    // Boxes specific to the untransformed sample entry type,
    e.g. 'ucmp'
}
```

The CompressionSchemeInfoBox may contain a SchemeTypeBox with a four-character code set to a specific code for generic compression or to the four-character code identifying the compression information box and may optionally contain a SchemeInformationBox itself containing a Compression information box like the 'gcif' box described in reference to FIG. 2. It is to be noted that the sample read in step 410 may correspond to the multiplexing or the packing of several components or views into a single sample. It may also cover more than one image in an input video sequence, especially when the decoding time has no meaning (e.g. uncompressed or raw video). The multiplexing may be described in the sample entry ('stsd' box).

Figure 5:
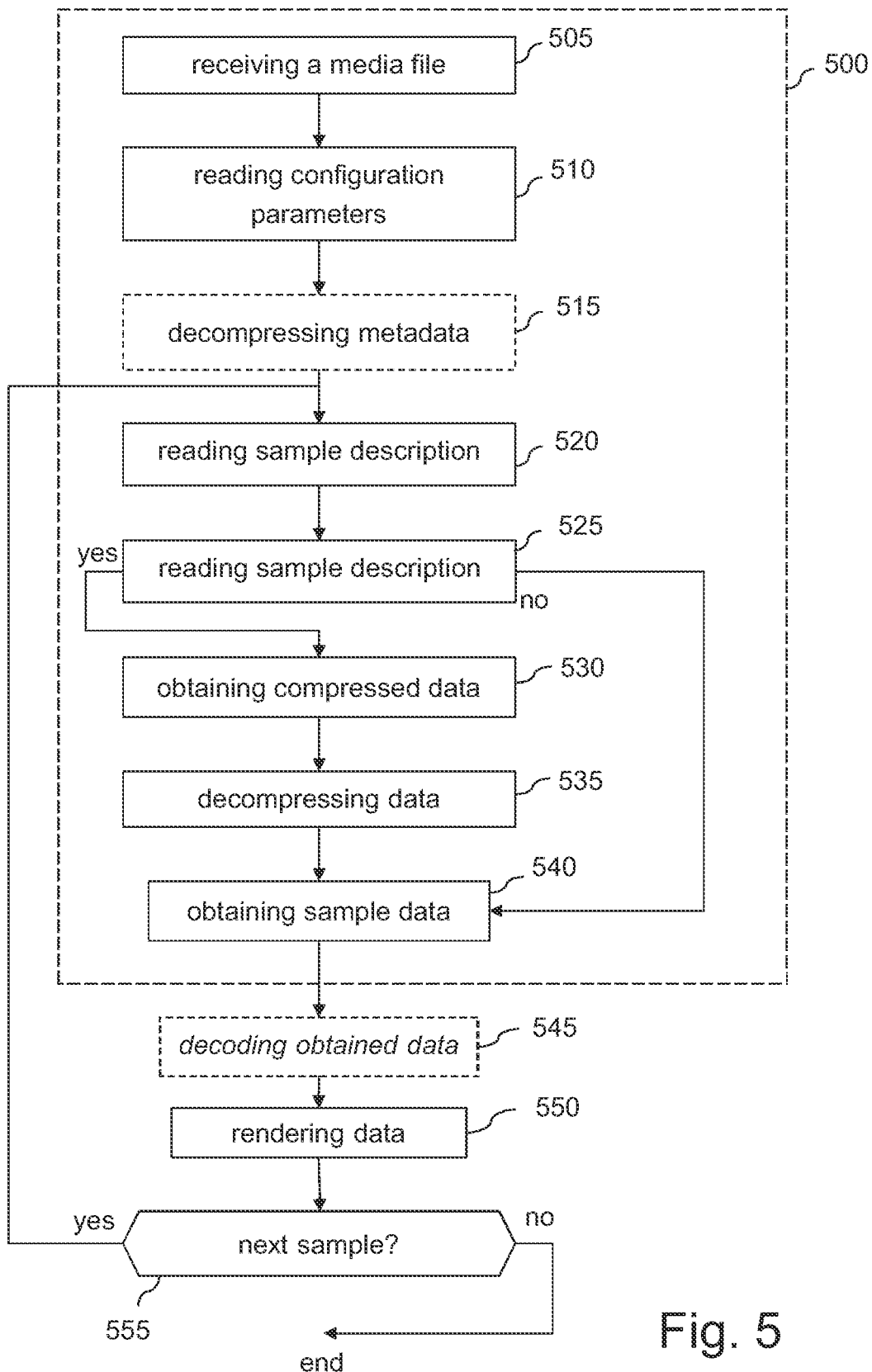
FIG. 5 illustrates an example of steps of a parsing process according to a second embodiment of the disclosure.

FIG. 5 illustrates an example of steps of a parsing process (steps referenced 500) according to a second embodiment of the disclosure, wherein the support for the compression corresponds to a sample (i.e. a picture or an image, for example a picture or an image from input data 125 in FIG. 1). Such steps may be carried out by the parser 120 in FIG. 1.

As illustrated, a first step (step 505) is directed to receiving a media file or segment files. Next, it is determined (step 510), for example in the 'ftyp' box (or the 'styp' box), whether or not some brands (major, minor, or compatible brands) indicate that some boxes are compressed or that a generic compression has been applied to samples. If some brands, for example 'isoc', indicate that some metadata boxes are compressed, they are decompressed during step 515.

Next, the sample description, in particular a sample entry, can be read (step 520) and a test is carried out to determine the sample entry type (step 525).

If the sample entry type corresponds to instructions for parsers or readers, i.e. if it is a specific sample entry, for example a restricted sample entry, the scheme type is read by parsing the sample entry. If the scheme type corresponds to a CompressionSchemeType and if some parameters for the scheme are present, the parser reads these parameters that may be used to configure the decompression module of the parser or reader.

If the sample entry type indicates samples for uncompressed video, the sample entry is further inspected to check whether some parameters or boxes provide indication of the use of a generic compression (e.g. a content_encoding parameter or a CompressionInformationBox), possibly with compression parameters. If such an indication is present, the compression parameters are obtained and used to configure the decompression module of the parser or reader.

Next, the data are read from the media data box (step 530), indicated in the sample entry through a data_reference_index. The number of bytes to read may be obtained from the sample size description, for example from SampleSizeBox or from TrackRunBox (if fragmentation is active). The position of the data to read in the media data box is also obtained from the sample description, for example from the ChunkOffsetBox and SampleToChunkBox, or from the TrackRunBox. Next, the read data are decompressed during step 535 using the decompression algorithm indicated either in a CompressionInformationBox or in a CompressionSchemeType when present or, by default, the DEFLATE algorithm.

From the decompressed data (step 535), sample data are made available by the parser at step 540 to the client (step 115 in FIG. 1) for rendering or displaying (step 550). For example, when the encapsulate data correspond to uncompressed video, the data obtained at 540 are uncompressed data, whatever they have been stored as compressed or not. Next, a test is carried out to determine or not there is a next sample to process (step 555). If there is a next sample to process, the algorithm loops at step 520 to read and process the next sample. It is to be noted that this test 555 could be done before outputting sample data in step 550, depending on the application needs, for example live rendering or buffering capabilities.

On the contrary, if there is no more sample to process, the process ends.

Optionally, a decoding step may be applied to samples following the parsing (step 540) for adaptation purpose regarding displaying or rendering in step 550 (for example a change of color space of chrominance sub-sampling or a resizing of the image).

If the sample entry type does not correspond to instructions for parsers or readers, for example if the sample entry is a well-known sample entry type such as 'avc1' or 'hvc1' indicating a format-specific compression, the sample data is simply read (step 540) from the media data box at the byte position computed from the sample description boxes (for example from 'stsc', 'stsz' and/or 'stco' boxes for non-fragmented file or from 'trun' box for fragmented files). The read data (e.g. a video bitstream) is provided to a format-specific decoder in charge of decoding the sample data (e.g. an AVC or HEVC or VVC video decoder, or an audio decoder) at step 545 before providing the data to the client for rendering at step 550.

It is observed that for the sake of clarity, parsing of classical audio or video tracks is not described here. However, it should be understood that the uncompressed data obtained from the parser or reader, for example the image data 140 in FIG. 1, may be rendered with additional media data such as media data 145 in FIG. 1. For example, uncompressed video corresponding to image data 140 in FIG. 1 may be rendered with synchronized audio corresponding to media data 145 in FIG. 1 or individual images corresponding to image data 140 in FIG. 1 may be rendered with text annotations corresponding to media data 145 in FIG. 1.

The embodiment described by reference to FIGS. 4 and 5 provides a means for encapsulation modules to indicate that a media file contains uncompressed video samples in a first parameter of the sample description (e.g. a sample entry type) and, in a second parameter, an indication whether it has been compressed or not. By parsing these items of information from the media file, parsers or readers are informed on the kind of data they will produce and on possible preliminary decompression steps to perform before providing the sample data to a renderer (e.g. the content_encoding parameter or a specific sample entry type providing instructions to readers).

Examples of Use of Indexed and Compressed Samples (Non Fragmented Cases)

FIG. 6a to FIG. 6g illustrate examples of indexing and then compressing samples according to the embodiments described by reference to FIG. 2, for different encapsulation configurations.

According to the illustrated examples, the boxes having thin edges represent non compressed data (metadata or media data) while the boxes having thick edges represent compressed data (metadata or media data).

Figure 6A:
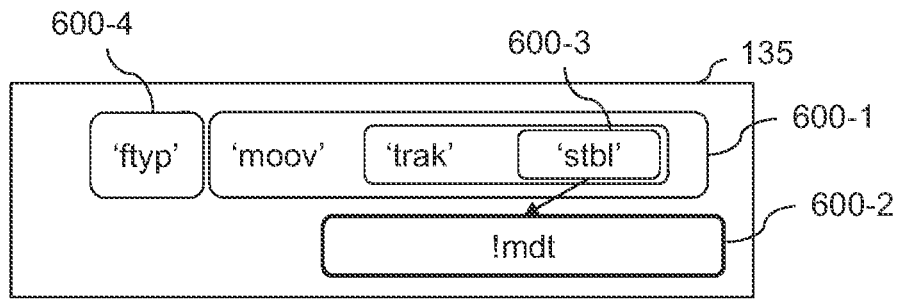
FIG. 6a to FIG. 6g illustrate examples of indexing and then compressing samples according to the embodiments described by reference to FIG. 2, for different encapsulation configurations.

FIG. 6a illustrates an example of a media file, for example media file 135 in FIG. 1 generated by encapsulation module 105. According to the illustrated example, the media file comprises a single track encapsulating uncompressed video samples that are compressed after being indexed as described by reference to FIG. 2. For such a configuration, a compressed version of the mdat box, referenced 600-2 and denoted '!mdt', is used while metadata part, referenced 600-1, is not compressed. The compressed media data box can be defined as follows:

---

Box Type: '!mdt'
Replacement Type: 'mdat'

-continued

```
Container: File
Mandatory: No
Quantity:   Zero or more
Syntax:
    aligned(8) class CompressedMediaDataBox
        extends CompressedBox('!mdt', 'mdat') {
    }
```

Box 600-2 contains the media data. Its semantics are the same as those for MediaDataBox but it requires decompression before the samples' data can be accessed so as to match the sample offsets and sizes given in the sample description referenced 600-3. It is observed that the size parameter in the BoxHeader of this box indicates the size of the box after compression.

The processing model for a compressed media data box by parsers, '!mdt' box, may be as follows:
- the BoxPayload of the compressed box (after the compressed box's BoxHeader structure) is decompressed;
- the box type of the compressed box ChM is replaced by the replacement type as specified for this particular compressed box (i.e. 'mdat');
- the compressed box size is replaced by the sum of the uncompressed payload size and the BoxHeader size (8 bytes, in the case of a simple 32-bit size);
- the compressed box payload is replaced by the uncompressed payload;
- the uncompressed box is read from the reconstructed BoxHeader, using uncompressed payload; and
- the parsing of the sample data can start from sample description boxes using the uncompressed box.

When such a compressed media data box is present in a media file, it may be signalled in the 'ftyp' box, referenced 600-4 in FIG. 6a, either
- by the existing 'isoc' brand extended to authorize the 'mdat' box to have its BoxPayload that is compressed (as already authorized for some top-level boxes such as 'moov', 'moof' . . . ) or
- by a new brand value, for example 'dcmp' meaning "data compression" after indexation, or "a posteriori compression", that requires support for a standard compression/decompression algorithm such as the DEFLATE algorithm by readers. Files or segments with this brand value present in their 'ftyp' or 'styp' box, respectively, may contain a CompressedIndexBox providing compression parameters.

This simple configuration may consist in applying the compression on the whole content of the 'mdat' box at once at the end of the encapsulation process (e.g. the data block corresponds to all the sample data for the whole file). It is noted that it is not the most convenient for enabling random access or for transmission purposes, but it may be the most efficient for reducing storage cost.

Figure 6B:
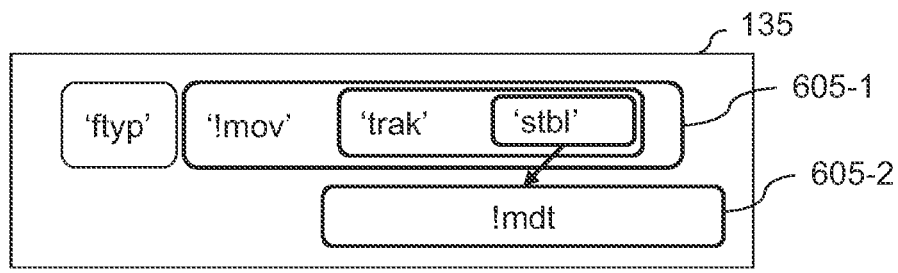

Like FIG. 6a, FIG. 6b illustrates an example of a media file, for example media file 135 in FIG. 1 generated by encapsulation module 105. Again, the media file comprises a single track encapsulating uncompressed video samples that are compressed after being indexed as described by reference to FIG. 2. However, according to this example, the metadata part, i.e. the 'moov' box, is also compressed leading to a '!mov' compressed box referenced 605-1. For such a configuration, the compressed version of the 'mdat' box, referenced 605-2, may be similar to the one described by reference to FIG. 6a.

The brands values may include the brand 'isoc' extended as described by reference to FIG. 6a or the brand 'isoc' plus a specific brand indicating that the media data part is compressed after indexation. The processing of such file requires metadata decompression (e.g. step 305 in FIG. 3) and generic data decompression (e.g. step 325 in FIG. 3) as specified according to FIG. 6a.

Figure 6C:
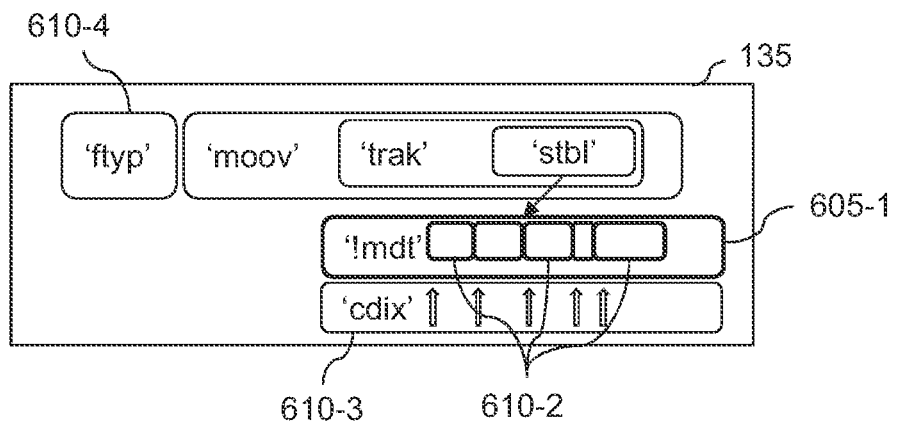

FIG. 6c illustrates an example of a media file, for example media file 135 in FIG. 1 generated by encapsulation module 105, that is suitable for random access. Compared to the configurations illustrated in FIG. 6a or 6b, the compressed media data box, referenced 610-1, contains several data blocks, generically referenced 610-2, each individually compressed (for example compressed during step 235 of the encapsulation process in FIG. 2). This means that during decompression step at parser or reader end (for example decompression step 325 in FIG. 3), the parser or reader needs to decompress each data block 610-2 individually, instead of the processing model described in reference to FIG. 6a. To make it possible, an additional index box, for example called "CompressedIndexBox" identified with the four-character code 'cidx' or "DataBlockIndexBox" identified with four-character code 'dbix', is generated during the encapsulation process (for example in step 255 in FIG. 2). This additional index, referenced 610-3 in FIG. 6c provides random access into the media file.

Data block may then correspond to a chunk of samples or to a time range (fixed time range or varying time range that can be configured, for example, during step 205 in FIG. 2). This index can be used by parsers or readers (for example at step 315 in FIG. 3) to read a given data block or to check presence of data blocks (for example test 320 in FIG. 3).

This additional index box may also provide as initial parameters a CompressionInformationBox describing the compression configuration in use. There may be one CompressionInformationBox if the compression configuration is static, or multiple instances when the compression configuration changes for some data blocks. The mapping of compression configuration to data block may be signalled at the beginning of the box, for example with run length encoding providing the mapping of data block range to a given configuration. It may alternatively be signalled at the beginning of each entry point in the compressed media data box 610-1. The same brands as the ones described with reference to FIG. 6a or 6b may be present in the 'ftyp' box referenced 610-4.

In encapsulation configurations where the metadata boxes are compressed, the additional index may also be compressed as done for segment index box or subsegment index box. At parser side, the index is of course usable, only after decompression. A compressed data block index box has then a specific four-character code with a replacement type corresponding to the four-character code of the non-compressed version of the data block index box. It is to be noted that in terms of index, the 'sidx' or 'ssix' boxes may be used to provide the byte offsets to movie fragments containing compressed media data boxes. To make safer the processing of 'sidx' or 'ssix' with compressed media data boxes, optionally a new version of the 'sidx' or 'ssix' boxes may be used. This guarantees that old readers will keep on processing 'sidx' or 'ssix' without any issue.

Figure 6D:
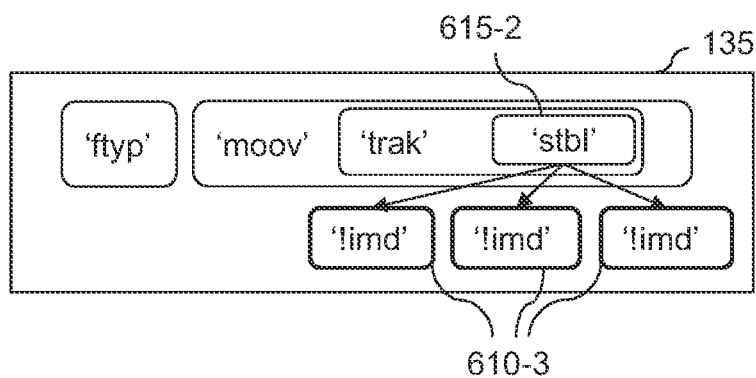

FIG. 6d illustrates an example of a media file, for example media file 135 in FIG. 1 generated by encapsulation module 105, that is suitable for random access, where the additional index (e.g. DataBlockIndex box or CompressedIndexBox) described by reference to FIG. 6c is replaced by the use of compressed media data boxes generically referenced 615-1, each with an identifier. There may be one compressed media data block with an identifier per compressed data block. A data block may correspond to a chunk of samples or to a time range, as described in reference to FIG. 6c.

Optionally the file may contain a time or chunk to data block index mapping table to make random access easier. The use of compressed media data boxes with identifiers 615-1 requires the sample entries to reference data entries providing an implicit index, for example such as the DataEntrySeqNumImdaBox. During encapsulation, the data_reference_index parameter in the sample entry describing the uncompressed video samples is set to the index in the data reference box 'dref' corresponding to a data entry providing an implicit index. The DataEntrySeqNumImdaBox may be used for compressed data blocks when the compression unit corresponds to the data for a whole movie fragment. Then, the sequence_number of the movie fragments is used as an identifier in a compressed media data box with identifier, like '!imd' box. Accessing data for the n-th fragment can be done by decompressing the compressed media data box with identifier having the value n. When data blocks do not correspond to the data for a whole movie fragment, the samples to compress a posteriori have a sample entry referencing a data reference index using a new DataEntryType with implicit index, specific for compressed data blocks. This new DataEntryType, is called, for example CompressedDataBlockEntry and may be defined as follows:

```
aligned(8) class CompressedDataBlockEntryBox (bit(24) flags)
    extends DataEntryBaseBox('cdbe', flags) {
    utf8string location; // optional
}
``` location is a URL that gives a location to find the resource containing the compressed media data corresponding to the indexed sample in the sample description boxes. The URL type should be of a service that delivers a file (e.g. URLs of type file, http, ftp etc.), and which services ideally also permit random access. Relative URLs are permissible and are relative to the file that contains this data reference. Location is a null string when the data are in the same file as the metadata.

The CompressedDataBlockEntryBox identifies the CompressedIdentifiedMediaDataBox (reference 615-1, defined below) containing the media data accessed through the data_reference_index corresponding to this CompressedDataBlockEntryBox. When a data_reference_index included in a sample entry refers to CompressedDataBlockEntryBox, each sample referring to the sample entry shall have its data compressed into a data block, after indexation, at media data offset corresponding to the first byte of the payload (the byte after the identifier of the '!imd') of the CompressedIdentifiedMediaDataBox (reference 615-1) that has imda_identifier equal to the index of the data block in the media file. Then, processing the CompressedIdentifiedMediaDataBox by increasing order of their identifier will allow to decompress data blocks in order and to access their data by parsing the sample description. An additional index (e.g. DataBlockIndex box or CompressedIndexBox) may however be useful when seeking in the media file is required. This additional index then provides a time to data block index and then to the compressed media data box containing the compressed data block at a given time.

The compressed media data box with identifier 615-1 may be defined as follows:

```
Box Type:       '!imd'
Replacement Type:   'imda'
Container: File
Mandatory: No
Quantity:   Zero or more
Syntax:
aligned(8) class CompressedIdentifiedMediaDataBox
    extends Box('!imd') {
        unsigned int(32) imda_identifier;
        bit(8) compressed_data[ ];// to end of box
}
```

Box 615-1 contains the media data. Its semantics are the same as those for MediaDataBox but it additionally contains an identifier that is used in setting up data references to the contained media data. A decompression is also needed before the sample data referencing the identifier present in this box can be accessed (in order to match the sample offsets and sizes given in the sample description referenced 615-2). The size parameter in the BoxHeader of this box indicates the size of the box after compression. imda_identifier differs from the imda_identifier values of the other IdentifiedMediaDataBoxes of the file and is not compressed to allow its use to locate data blocks for random access.

The processing model for a compressed media data box by parsers, '!imd' box, may be as follows:
  the BoxPayload of the compressed box (after the imda_identifier parameter) is decompressed. The first byte to decompress is the first byte immediately following the imda_identifier parameter, and the last byte is given by the box size;
  the box type of the compressed box ('!mdt') is replaced by the replacement type as specified for this particular compressed box (i.e. 'imda');
  the compressed box size is replaced by the sum of the uncompressed payload size and the BoxHeader size (8 bytes, in the case of a simple 32-bit size) plus the 32 bits for the imda_identifier;
  the compressed data is replaced by the uncompressed payload;
  the uncompressed box is read from the reconstructed BoxHeader and uncompressed payload; and
  the parsing of the sample data can start from sample description boxes and sample entries referencing the imda_identifier of the uncompressed box.

When such a compressed media data box is present in a media file, it may be signalled in the 'ftyp' box, referenced 615-3, either
  by the existing 'isoc' brand extended to authorize the 'imda' box to have its BoxPayload compressed (as already authorized for some top-level boxes such as 'moov', 'moof' . . . ) or
  by a new brand value, for example 'idcp' meaning "identified data compression" after indexation, or "a posteriori compression", that requires support for a standard compression/decompression algorithm such as the DEFLATE algorithm by parsers or readers. Files or segments with this brand value present in their 'ftyp' or 'styp' box, respectively, may contain a CompressedIndexBox providing compression parameters, for example such as another compression algorithm, memory requirements for the decompression As an alternative to a data entry providing an implicit index, the DataEntryImdaBox could be used. However, such a solution may not be optimal since it requires the encapsulation module to first determine the number of data blocks for the whole file and to allocate a same number of DataEntryImdaBox in the DataReferenceBox and also to allocate a same number of sample entries in the sample description. Each sample of a same data block, i-th data block of the file, will refer, for example through the SampleToChunkBox, to the i-th sample entry in the sample description box, this i-th sample entry itself referencing the data entry having its imda_ref_identifier equal to "i" (with "i" being the index of the data block in the file). This may be acceptable for short files and when the metadata part is compressed. This is not suitable for live encapsulation or for low-delay encapsulation. A parser or reader can access a given data block by parsing the identifier of 'imda' boxes.

Figure 6E:
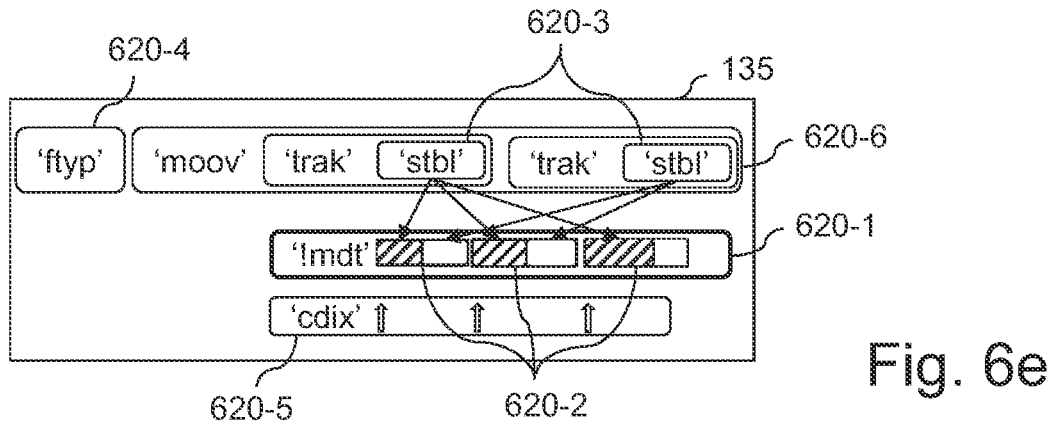

FIG. 6e illustrates an example of a media file, for example media file 135 in FIG. 1 generated by encapsulation module 105, that is suitable for random access and multiplexing data for two tracks for uncompressed video within a same media data box 620-1. The two tracks may consist, for example, in a first track for uncompressed video and in a second track for text annotations, subtitles, or metadata. A data block may correspond to a chunk of samples or to samples for a given time range for a given track or to a chunk of samples across the two tracks for a given time range (as represented and generically referenced 620-2). The media data box is the compressed media data box as described in reference to FIG. 6a but each data block is decompressed individually as described in reference to FIG. 6c. Then, the chunk of samples for each track can be accessed by parsing their respective sample description 620-3. The same brands as the ones described by reference to FIG. 6a may be present in the 'ftyp' box referenced 620-4. An additional index (e.g. DataBlockIndex box or CompressedIndexBox) referenced 620-5, as the one described by reference to FIG. 6c, provides entry points to compressed data blocks 620-2. The metadata part of the file, referenced 620-6, may also be compressed as described by reference to FIG. 6c.

Figure 6F:
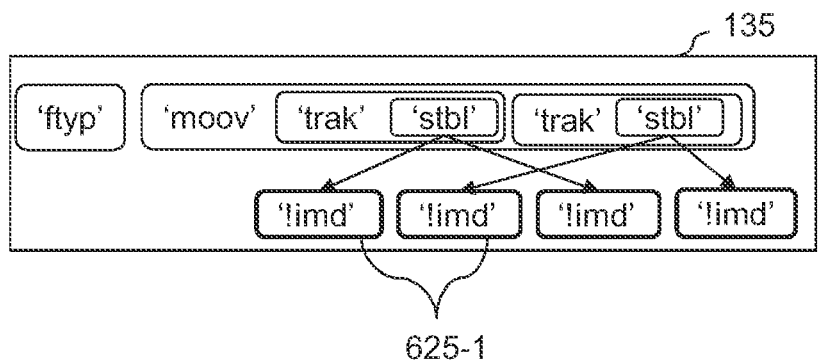

FIG. 6f illustrates an example of a media file, for example media file 135 in FIG. 1 generated by encapsulation module 105, that is suitable for random access and with multiple tracks for uncompressed video. As for FIG. 6d, several compressed media data boxes generically referenced 625-1 are used, as described by reference to FIG. 6f.

Figure 6G:
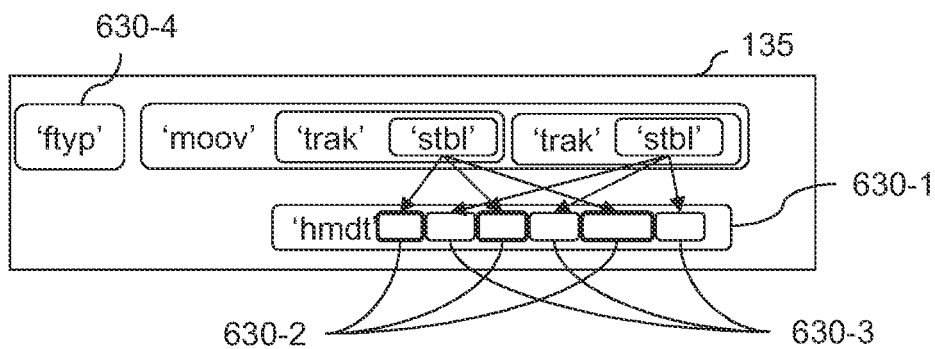

FIG. 6g illustrates an example of a media file, for example media file 135 in FIG. 1 generated by encapsulation module 105, that is suitable for random access and with multiple tracks, at least one for uncompressed video and at least one for other media. As illustrated, a specific media data box referenced 630-1 (or hybrid media data box) contains both compressed data blocks generically referenced 630-2 and chunk of samples generically reference 630-3. The data blocks in this case are chunks of samples and should be individually decompressed to access to sample data, based on their sample description. Specific brands may be set in the 'ftyp' box referenced 630-4 to indicate that the file contains media data box mixing samples and compressed data blocks and also contains an additional index (e.g. DataBlockIndex box or CompressedIndexBox) as described by reference to FIG. 6c providing byte offsets to compressed data blocks 630-2 and to sample chunks 630-3.

The specific media data box referenced 630-1 (or hybrid media data box) may be defined as follows:

Box Type: 'hmdt'
Mandatory: No
Quantity: Zero or more

Syntax:
```
aligned(8) class HybridMediaDataBox extends FullBox('hmdt') {
  unsigned int[32] data_block_number;
  for (int i=0; i< data_block_number; i++) {
    unsigned int[32] data_block_offset;
    unsigned int[32] data_block_length;
    unsigned int[32] original_chunk_offset; //optional
  }
  bit(8) data[ ];
}
```

This box contains the media data. In video tracks, this box would contain video images. A presentation may contain zero or more HybridMediaDataBoxes. The actual media data follows the type field indicated by sample entry type or by item_type. Its structure is described by the structure-data (e.g. sample description boxes or ItemLocationBox for items). The data[ ] parameter is the contained media data. The media data may consist in compressed data blocks or chunk or run of samples or both for timed media data (e.g. video, audio, subtitles, etc.). The number of data_blocks present in this box is indicated by the data_block_number parameter. The data_block_length parameter provides the length in bytes of a compressed data block. Then, for each data block, the byte offset to reach this data block is provided in data_block_offset parameter. Optionally, the initial byte offset for the sample, item or chunk or run of samples that have been compressed after being indexed is also provided (e.g. original_chunk_offset parameter) so that the mapping between sample offset and data in the hybrid media data box is preserved. The absence or presence of the original chunk offset may be controlled by a version number or by a flags value. These two offsets, when present in the hybrid media data box provides the additional index for data block access. The original_chunk_offset also allows readers to check during decompression of data blocks that offsets are still valid. The value of original_chunk_offset may be relative to the start of the containing file or from the first byte of the HybridMediaDataBox. A specific DataEntryUrlBox may be defined to indicate the samples or item referencing this data entry in the data reference have their data stored in an HybridMediaDataBox. The syntax for this specific DataEntryUrl is the same as for DataEntryUrlBox. For example, this specific DataEntryUrlBox is defined as a HybridDataEntryUrl extending the DataEntryUrlBox. The media data may also contain data for items (e.g. image item). For items, media data may be stored as data or extents for items or as data block, as may be indicated by the compression_support parameter of the Compression Information Box (e.g. GenericCompressionInfoBox 'gcif'). An HybridMediaDataBox 630-1 contains the media data. Its semantics are the same as those for MediaDataBox but it requires decompression on some parts of its data before the samples' data (or item data) can actually be accessed so as to match the sample offsets and sizes given in the sample description referenced 600-3 or item location given in the ItemLocationBox. It is observed that the size parameter in the BoxHeader of this box indicates the size of the box after compression.

The processing model for an hybrid media data box by parsers, 'hmdt' box, may be as follows:
  the BoxPayload of the compressed box (after the compressed box's BoxHeader structure) is decompressed on a data block basis; the position in the box of each data block is given by the data_block_offset. The data blocks may be decompressed on purpose, for example to extract samples data or to seek to a particular offset in the file, without reconstructing an 'mdat' box (i.e. no replacement box);

the box type of the compressed box ('hmdt') may be replaced by 'mdat' type if the parser wants to transcode the file into a regular file without a posteriori compression or if it wants to build an internal representation in memory of the indexed data (i.e. after decompression);

in case of box replacement, the compressed box size is replaced by the sum of the uncompressed payload size and the BoxHeader size (8 bytes, in the case of a simple 32-bit size);

in case of box replacement, the compressed box payload is replaced by the uncompressed payload;

in case of box replacement, the uncompressed box is read from the reconstructed BoxHeader, using uncompressed payload;

in case of box replacement, the parsing of the sample data can start from sample description boxes using the uncompressed box; and when the original_chunk_offset is present in the 'hmdt' box, a sample, chunk or run of samples or item position may be read from sample description boxes or from ItemLocationBox (for items). The parser checks the corresponding data_block_offset with this sample or item position. Then, the number of bytes indicated by data_block_length is decompressed. The parser then checks that the cumulated offsets after decompression is consistent with the original_chunk_offset value plus the size of the sample, items or cumulated sizes of the chunk or run of samples. Then access to each sample data can be performed.

When such an hybrid media data box is present in a media file, it may be signalled in the 'ftyp' box, referenced 630-4 in FIG. 6g, either by the existing 'isoc' brand extended to authorize presence of an hybrid media data box 'hmdt' with its BoxPayload that mixes compressed data blocks and indexed samples or items data, or by a new brand value, for example 'dcmp' meaning "data compression" after indexation, or "a posteriori compression", that requires support for a standard compression/decompression algorithm such as the DEFLATE algorithm by readers and possibly the support of hybrid media data box like 'hmdt'. Files or segment files with this brand value present in their 'ftyp' or 'styp' box, respectively, respectively, may contain a CompressedIndexBox providing compression parameters.

Another alternative for the configuration described by reference to FIG. 6g could be to mix a compressed media data box to store compressed data blocks for the track containing uncompressed video (for example uncompressed video 125 in FIG. 1) and a classical media data box to store the samples for the track corresponding to other media data (for example media data 130 in FIG. 1). The additional index (e.g. DataBlockIndex box or CompressedIndexBox) would then just provide byte offsets to the compressed data blocks, the classical media data box would not need additional index. The data reference would contain at least one data entry for the compressed media data box (e.g. CompressedDataBlockEntryBox ('cdbe')) and at least one data entry for the classical media data box.

Yet another alternative is to use a classical media data box for the track containing the chunk of samples 630-3 and compressed media data boxes with identifier (e.g. '!imd') for the compressed data blocks 630-2.

Examples of Use of Compressed and Indexed Samples (Fragmented Cases)

FIG. 7a to FIG. 7f illustrate examples of indexing and then compressing samples according to the embodiments described by reference to FIG. 2, for different encapsulation configurations, wherein the encapsulation module generates fragmented files as a single file or as multiple segments. Such encapsulation configurations may be useful for progressive transmission, for live recording, or to reduce memory storage requirements on both server and client sides.

According to the illustrated examples, the boxes having thin edges represent non compressed data (metadata or media data) while the boxes having thick edges represent compressed data (metadata or media data).

Figure 7A:
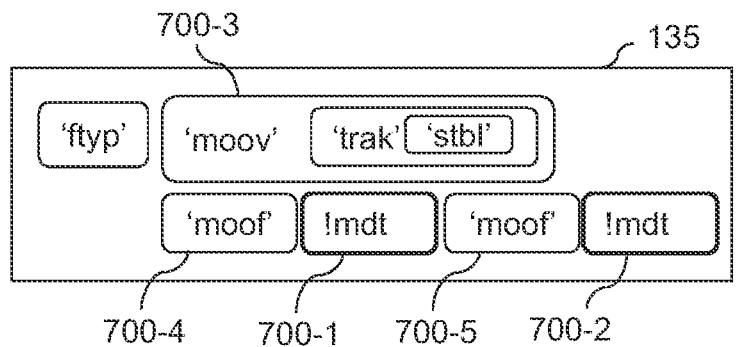
FIG. 7a to FIG. 7f illustrate examples of indexing and then compressing samples according to the embodiments described by reference to FIG. 2, for different encapsulation configurations, wherein the encapsulation module generates fragmented files as a single file or as multiple segments.

FIG. 7a illustrates an example of a media file, for example media file 135 in FIG. 1 generated by encapsulation module 105, encapsulating a single track with fragments. Media data for fragments are stored or transmitted as compressed data blocks in specific boxes referenced 700-1 and 700-2, for example similar to box 600-2 in FIG. 6a. According to the illustrated example, the metadata boxes, referenced 700-3, 700-4, and 700-5, are not compressed. The brands in the 'ftyp' box indicate that compressed data boxes are in use, for example the 'isoc' brand is extended to allow the 'mdat' box to be compressed or a new specific brand is defined to indicate that the compressed media data box should be decompressed before using the content of metadata box 700-3 and fragment information ('moof' with 'traf' 700-4 or 700-5) to access to sample data. By default, the decompression applies to the whole compressed media data box 700-1 or 700-2. The data block preferably corresponds to the data of the samples corresponding to a track fragment. The encapsulation module encapsulates the sample into a fragment, the sample description being in track run box (e.g. step 215 in FIG. 2), buffers the sample data for the fragment in a data block (e.g. step 225 in FIG. 2), compresses the data block (e.g. step 235 in FIG. 2), and stores the compressed data block in the compressed media data box. At the parser or reader side, each compressed media data box (e.g. media data block 700-1 or 700-2 in FIG. 7a) is processed as the processing model for a compressed media data box described in reference to FIG. 6a. This configuration, where a data block corresponds to data for a given fragment is suitable for live packaging, for temporal random access, and for progressive download.

Figure 7B:
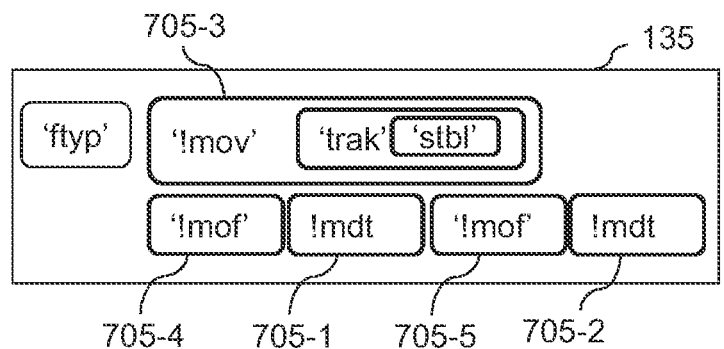

FIG. 7b illustrates an example of a media file, for example media file 135 in FIG. 1 generated by encapsulation module 105, encapsulating a single track with fragments. Media data for fragments are stored or transmitted as compressed data blocks in boxes referenced 705-1 and 705-2. According to the illustrated example, the metadata boxes are also compressed in boxes 705-3, 705-4, and 705-5. For such a configuration, the same compressed version as the 'mdat' box 605-2 in FIG. 6b can be used. The brands values may include the brand 'isoc' extended as described by reference to FIG. 6a or the brand 'isoc' plus a specific brand indicating that the media data part is compressed a posteriori regarding indexation. The processing of such a file requires metadata decompression (e.g. step 305 in FIG. 3) and generic data decompression (e.g. step 325 in FIG. 3). The processing of the compression media data boxes 705-1 and 705-2 follows the processing model for a compressed media data box described in reference to FIG. 6a.

Figure 7C:
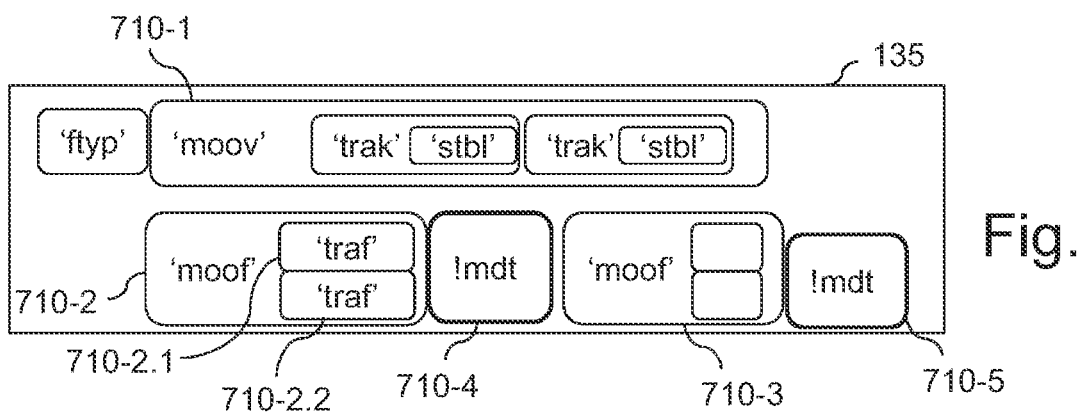

FIG. 7c illustrates an example of a media file, for example media file 135 in FIG. 1 generated by encapsulation module 105, encapsulating multiple tracks with fragments. Media data for fragments from all tracks are stored or transmitted as compressed data blocks in several '!mdt' boxes. While the metadata boxes referenced 710-1, 710-2, and 710-3 are not compressed within the illustrated example, they could be compressed without major changes. The track fragments are multiplexed in the same movie fragment box. For example, one movie fragment box 710-2 or 710-3 may contain multiple track fragments such as track fragments 710-2.1 and 710-2.2.

During encapsulation, the corresponding data for each track fragment may be concatenated in a single data block, especially if there is only one run of samples per track fragment. In such a case, the data for the samples of the track fragments are indexed, buffered, and then compressed before being stored in a compressed media data box such as '!mdt' boxes 710-4 or 710-5. A data block corresponds to the data for the fragment. The compressed media data box 710-4 or 710-5 and brands in 'ftyp' can be the ones described in reference to FIG. 6a. While this configuration is suitable for live packaging and temporal random access, it may not be optimal for track selection or parallelization of track encapsulation (because of the cross track compression).

To overcome this limitation or in case access to each track or track fragment is needed in the considered application, a data block may correspond to a single track fragment. For example, as illustrated in FIG. 7c, the compressed media data box 710-4 or 710-5 would contain two compressed data blocks, one per track fragment (e.g. track fragments 710-2.1 and 710-2.2).

The decompression of the compressed media data box 710-4 or 710-5 at the parser or reader side may be done in several steps: one decompression per data block. For accessing a particular data block, an additional index (e.g. DataBlockIndex box or CompressedIndexBox, not represented) may be needed for accessing a data block within a compressed media data box. A similar index to the "compressed data index box" described in reference to FIG. 6c may be used. This additional index may provide a byte offset to data blocks present in a compressed data block from a base data offset. The base data offset may be the first byte of the fragment (e.g. the first byte of the 'moof' box 710-2 or 710-3) or from the first byte of the compressed media data box (e.g. the first byte of the '!mdt' box 710-4 or 710-5).

The segment index box may be used to provide access to the start of a movie fragment, in addition to the additional data blocks to locate data blocks within a fragment. The compressed version of 'sidx', the '!six' box, when metadata boxes are compressed, may also be used. When the base data offset is the start of the file, the 'sidx' may not help in locating the data blocks. The base data offset may be defined once for all in the media file such as media file 135 in FIG. 1, for example during the configuration step 205 in FIG. 2, or for each media fragment.

This additional index allows handling an encapsulation configuration in which a track fragment contains several track run boxes. In such a case, a compressed media box within a movie fragment may contain data blocks corresponding to a run of samples from the different track fragments. The additional index provides byte offsets to each compressed data block, a data block corresponding to a run of samples described in a 'trun' box. Then, accessing a run of samples within a track fragment requires the decompression of a data block and not necessarily the decompression of the whole compressed media data box. Once decompressed, the corresponding sample data can be accessed from the indication of the 'trun' box. This configuration with several track run boxes within a track fragment preferably uses the tr_flags value indicating no data-offset-present so that data blocks are contiguous in the compressed media data box. Then, bytes offsets provided in the additional index come in the same order as the track run boxes in the movie fragment. The mapping between a data block and a track run is then implicit.

Figure 7D:
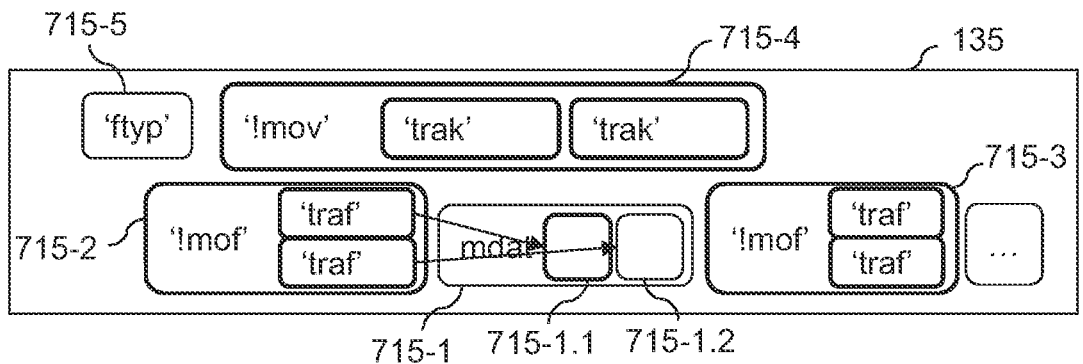

FIG. 7d illustrates an example of a media file, for example media file 135 in FIG. 1 generated by encapsulation module 105, encapsulating multiple tracks with fragments. Media data for fragments from a first set of tracks are stored or transmitted as compressed data blocks, for example data block 715-1.1, while media data for a second set of tracks are stored or transmitted as samples, for example sample 715-1.2, compressed with a format-specific encoder (e.g. AVC, HEVC, or VVC video track, or an AAC audio track, etc.). The track fragments are multiplexed in the same movie fragment box, for example movie fragment box 715-2 or 715-3. For the sake of illustration, the metadata boxes referenced 715-2, 715-3, and 715-4 are compressed but they could be not compressed without major changes.

In this encapsulation configuration, the media data box contains both data blocks and samples. It may be a Media Data Box such as 'mdat' 715-1 or the hybrid media data box 'hmdt' as described by reference to FIG. 6g. Specific brands may be set in the 'ftyp' box 715-5 to indicate that the file contains one or more media data box mixing samples and compressed data blocks. An additional index (e.g. DataBlockIndex box or CompressedIndexBox such as the 'cidx' in FIG. 6c) may be present to provide byte offsets to compressed data blocks, for example to compressed data block 715-1.1 and to chunks of samples, for example chunk of samples 715-1.2, especially when a track fragment contains several track run boxes.

Figure 7E:
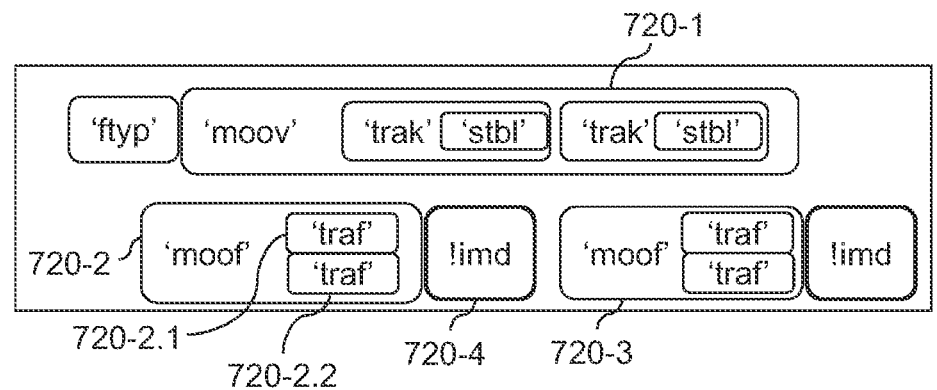

FIG. 7e illustrates an example of a media file, for example media file 135 in FIG. 1 generated by encapsulation module 105, encapsulating multiple tracks with fragments. Data for fragments from all tracks are stored or transmitted as compressed data blocks. While the metadata boxes referenced 720-1, 720-2, and 720-3 are not compressed within the illustrated example, they could be compressed without major changes.

As illustrated, a movie fragment may contain one or more track fragments (e.g. track fragments 720-2.1 and 720-2.2) with their data multiplexed in a media data box, for example in media data box 720-4. The media data box is a compressed version of a media data box with an identifier as described with reference to FIG. 6d. Data entries may be DataEntrySeqNumImdaBox, i.e. providing an implicit index (here the sequence number of a movie fragment). A data block in this encapsulation configuration may correspond to the data for the tracks and the whole fragment. It may correspond to a chunk or a run of samples for a given track, or to a time range for the tracks present in the movie fragment. This is suitable for progressive download and random access. A compression information box may indicate the data block support (run of samples, whole fragment). An additional index (e.g. DataBlockIndex box or CompressedIndexBox such as 'cidx' in FIG. 6c) may provide offsets to data blocks within a movie fragment, as explained with reference to FIG. 7c. An additional index may not be needed when a data block corresponds to the whole movie fragment, since media data boxes provide an identifier, and this identifier is not compressed (as described with reference to FIG. 6c) and corresponds to the unique data block for the movie fragment. To access sample data, parsers or readers have to decompress each data block and then to use the track run box to access one or another sample.

As a variant for the encapsulation illustrated in FIG. 6e, a media data box providing an identifier (e.g. 'imda') may be used in its uncompressed version instead of the '!imd' box. A compression information box may then indicate that media data box contains compressed data blocks that may need a priori decompression before being accessed.

Figure 7F:
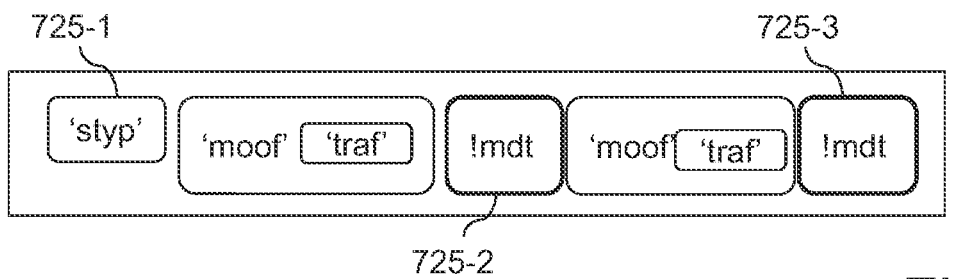

FIG. 7f illustrates an example of a media file, for example media file 135 in FIG. 1 generated by encapsulation module 105, encapsulated as a segment file, as indicated by the 'styp' box 725-1. This 'styp' box contains brands characterizing the segment. For example, it may contain a specific brand indicating that the data are compressed data blocks and not classical samples. The compressed data blocks are stored, per fragment in compressed media data boxes, for example in compressed media data boxes 725-2 and 725-3.

According to the illustrated example, the segment contains two movie fragments, each containing a single track. The data block may correspond here to the whole data for a track fragment and additional index (e.g. DataBlockIndex box or CompressedIndexBox) may not be present. The brand indication or the four-character code of the compressed media data box is an indication to the player or reader that a priori decompression is required before accessing sample data in a track fragment. The example segment in FIG. 7f illustrates a segment file containing two movie fragments, these fragments being encapsulated as in FIG. 7a. The segmentation could apply to any fragment configuration from FIGS. 7a to 7e, with the same characteristics regarding brands, media data box and additional index, or compression information boxes for a given fragment configuration. In the FIGS. 7a to 7e, the 'ftyp' and 'moov' box are stored in an initialization segment, one or more movie fragments ('moof' box and its associated media data) being stored into segments or media segments.

It is to be noted that the inclusion of brands indicating the use of specific media data boxes (e.g. compressed media data box '!mdt' or compressed media data box with identifier '!imd' or hybrid media data box 'hmdt') may also be included at track level, for example in a TrackTypeBox, to precise which tracks actually use at least one of these specific boxes or in a Brand Property for items using at least one of these specific boxes. It is also to be noted that even if the additional index (e.g. CompressedIndexBox or DataBlockIndexBox) are described as boxes within the metadata part of the file, they may alternatively be stored in external, or companion, file of the media file 135. When the media file is transmitted for example using DASH, for client to get the additional index, an additional request may be sent to the server.

Media File Exchanges

When encapsulated media files, for example media file 135 in FIG. 1, have to be exchanged between a server and a client or a media player, their MIME (Multipurpose Internet Mail Extensions) type needs to be indicated. The MIME type may be video or images and the subtype may be mp4 for video and heif for individual images. As there can be a great variety of configurations within this combination of type and subtype, additional indication can be helpful to media players. Having specific item type or sample entry value allows interoperable exchange of media files encapsulating uncompressed image or video data. Indeed, the specific item or sample entry type may be used in the "codecs" parameter of a MIME type to specify the type of the media resource, or in the "itemtypes" parameter of a MIME type for an HEIF file. A client such as client 115 in FIG. 1, may determine by examining the MIME type whether it can render the media tracks or items (or at least some) present in the media file. Likewise, a client with limited resources may, based on MIME types, decide whether it can support and render the media file. Currently, MIME types for ISO Base Media files encapsulating uncompressed data is not specified to enable readers to determine whether the file contains uncompressed or codec-specific video or images and whether the uncompressed video or image has been generic-compressed or whether some decompression algorithm, for example such as the DEFLATE algorithm, should be available at the reader side. Therefore, elements from the above embodiments may be used in some MIME type parameters. This is useful for example, when the file is available on a server for transmission over HTTP, to indicate the content type.

For example, if image data such as image data 125 in FIG. 1 are uncompressed video data, the MIME type may be defined as follows:

MIME type: video/mp4; codecs=SPECIFIC_TYPE; profiles=MAJOR_BRAND where

SPECIFIC_TYPE corresponds to the specific sample entry type (e.g. 'ucmp' or 'ucpi' or 'iraw' indicating uncompressed video data) and MAJOR_BRAND corresponds to the value for the major_brand parameter indicated in the 'ftyp' box of the media file, for example media file 135 in FIG. 1, or 'type' box if the media file comes as segment files. For example, it may be a new brand indicating that some generic compression has to be supported by readers or an extension of the existing 'isoc' brand.

In case the encapsulation is done according to FIG. 4, using a specific sample entry for pre-decoding, the MIME type may be the following one:

MIME type: video/mp4; codecs=comp.ucmp; profiles=MAJOR_BRAND where "comp" indicates a generic compression and "ucmp" uncompressed video samples. Note that 'comp' may be replaced by 'resv' if the restricted sample entry is used instead of the pre-decoding one indicating a compression.

As another example, if the image data are individual images, encapsulated as image items in the media file, then the MIME type for such file may be as follows:

image/heif; itemtypes=SPECIFIC_TYPE where

SPECIFIC_TYPE corresponds to the specific item type (e.g. 'ucmp' or 'ucpi' or 'iraw' indicating uncompressed image items). This specific type value may be followed by an indication of a number of pixels for the uncompressed image:

image/heif; itemtypes=SPECIFIC_TYPE.NB_PIXELS

If the image item corresponding to the uncompressed image is not the primary item of the file (for example if it is another HEVC image such as media data 130 in FIG. 1 that is encapsulated in the same media file), it may be indicated in the itemtypes parameter of the MIME type as one of the comma-separated item declaration as follows:

image/heif; itemtypes=hvc1.A1.80.L93.B0+hvcC, SPECIFIC_TYPE.NB_PIXELS

A new parameter may be defined to indicate whether compression has been applied a posteriori or if data comes as compressed data blocks, possibly indicating the algorithm used for the compression:

compression="deflate" or compression="none" or compression="bzip2".

This parameter requires readers to support the given compression algorithm in order to render the media file. When the parameter compression indicates "none" or is not present in the MIME type, then the reader assumes that no a priori decompression is required on encapsulated data.

Device for Encapsulation or Parsing

Figure 8:
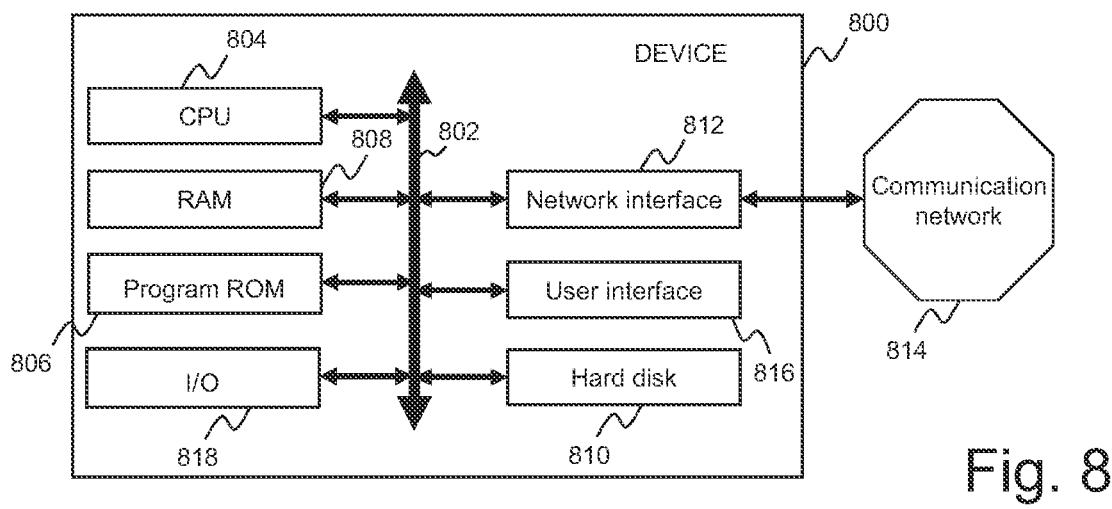
FIG. 8 schematically illustrates a processing device configured to implement at least one embodiment of the present disclosure.

FIG. 8 is a schematic block diagram of a computing device 800 for implementation of one or more embodiments of the disclosure. The computing device 800 may be a device such as a micro-computer, a workstation or a light portable device. The computing device 800 comprises a communication bus 802 connected to:

- a central processing unit (CPU) 804, such as a microprocessor;
- a random access memory (RAM) 808 for storing the executable code of the method of embodiments of the disclosure as well as the registers adapted to record variables and parameters necessary for implementing the method for transmitting media data, of which the memory capacity can be expanded by an optional RAM connected to an expansion port for example;
- a read only memory (ROM) 806 for storing computer programs for implementing embodiments of the disclosure;
- a network interface 812 that is, in turn, typically connected to a communication network 814 over which digital data to be processed are transmitted or received. The network interface 812 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 804;
- a user interface (UI) 816 for receiving inputs from a user or to display information to a user;
- a hard disk (HD) 810;
- an I/O module 818 for receiving/sending data from/to external devices such as a video source or display.

The executable code may be stored either in read only memory 806, on the hard disk 810 or on a removable digital medium for example such as a disk. According to a variant, the executable code of the programs can be received by means of a communication network, via the network interface 812, in order to be stored in one of the storage means of the communication device 800, such as the hard disk 810, before being executed.

The central processing unit 804 is adapted to control and direct the execution of the instructions or portions of software code of the program or programs according to embodiments of the disclosure, which instructions are stored in one of the aforementioned storage means. After powering on, the CPU 804 is capable of executing instructions from main RAM memory 808 relating to a software application after those instructions have been loaded from the program ROM 806 or the hard-disc (HD) 810 for example. Such a software application, when executed by the CPU 804, causes the steps of the flowcharts shown in the previous figures to be performed.

In this embodiment, the apparatus is a programmable apparatus which uses software to implement the disclosure. However, alternatively, the present disclosure may be implemented in hardware (for example, in the form of an Application Specific Integrated Circuit or ASIC).

While the disclosure has been illustrated and described in detail in the drawings and foregoing description, such illustration and description are to be considered illustrative or exemplary and not restrictive, the disclosure being not restricted to the disclosed embodiment. Other variations on the disclosed embodiment can be understood and performed by those skilled in the art, in carrying out the claimed disclosure, from a study of the drawings, the disclosure and the appended claims.

Such variations may derive, in particular, from combining embodiments as set forth in the summary of the disclosure and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the disclosure.

The invention claimed is:

1. A method for outputting a sample from an ISO Base Media File Format (ISOBMFF) standard compliant file, the method comprising:
   - obtaining, from the ISOBMFF compliant file, a compressed sample;
   - obtaining, from the ISOBMFF compliant file, a sample entry comprising a predefined type indicating that the compressed sample corresponds to a sample of an uncompressed video, an item of information indicating a type of compression applied to the sample of the uncompressed video and an item of information indicating an entity being compressed within the compressed sample;
   - decompressing the obtained compressed sample, as a function of the type of compression and of the item of information indicating the entity being compressed; and
   - outputting the decompressed obtained sample.

2. The method of claim 1, further comprising obtaining, from the ISOBMFF compliant file, at least one parameter of the compression, the at least one parameter being stored in a dedicated ISOBMFF box at the top-level of the ISOBMFF compliant file or being stored within the sample entry.

3. The method of claim 1, wherein the sample entry comprises a compression information box comprising the item of information indicating the type of compression and the item of information indicating the entity being compressed.

4. The method of claim 1, wherein the sample entry is a restricted sample entry.

5. The method of claim 4, wherein the restricted sample entry comprises a scheme type indicating that a generic compression has been applied to the sample and comprises an original format box comprising the predefined type.

6. The method of claim 1, wherein the entity is one of the following:
   - the sample
   - a part of the sample.

7. A method for encapsulating media data into an ISO Base Media File Format (ISOBMFF) standard compliant file, the media data comprising a sequence of samples of an uncompressed video, the method comprising:
   - obtaining at least one sample of the sequence of samples;
   - generating ISOBMFF structure data indexing the at least one obtained sample;
   - defining a data block as a function of one or several of the at least one obtained samples;

compressing the at least one obtained sample comprising compressing one or several samples according to the data block; and generating an ISOBMFF compliant file including the generated ISOBMFF structure data and the compressed at least one sample, wherein samples corresponding to several data blocks are stored within one or several media data ISOBMFF boxes.

8. The method of claim 7, further comprising obtaining at least one parameter of the compression and embedding the obtained at least one parameter within the ISOBMFF compliant file, the at least one parameter being stored in a dedicated ISOBMFF box at the top-level of the ISOBMFF compliant file or being stored within a sample description of the at least one obtained sample.

9. The method of claim 8, wherein the at least one parameter comprises an identifier of a compression algorithm or wherein a DEFLATE compression algorithm is used by default in case no compression algorithm is identified within the ISOBMFF compliant file.

10. The method of claim 7, wherein the ISOBMFF compliant file comprises at least one first media data ISOBMFF box comprising the compressed at least one sample and at least one second media data ISOBMFF box comprising samples not being compressed with a lossless compression algorithm or wherein the ISOBMFF compliant file comprises at least one first media data ISOBMFF box comprising the compressed at least one sample and comprising samples not being compressed with the lossless compression algorithm.

11. The method of claim 7, wherein the ISOBMFF compliant file comprises at least one top-level structure data box containing a brand parameter signaling compressed indexed samples in the ISOBMFF compliant file.

12. A method for generating displayable media data from an ISO Base Media File Format (ISOBMFF) standard compliant file generated by obtaining at least one sample of the sequence of samples, generating ISOBMFF structure data indexing the at least one obtained sample, compressing the at least one obtained sample and generating an ISOBMFF compliant file including the generated ISOBMFF structure data and the compressed at least one sample, the method comprising:

obtaining, from the ISOBMFF compliant file, at least one compressed sample;

decompressing the at least one obtained sample;

obtaining, from the ISOBMFF compliant file, ISOBMFF structure data indexing the decompressed at least one obtained sample;

generating displayable media data as a function of the obtained ISOBMFF structure data and of the decompressed at least one obtained sample.

13. The method of claim 12, further comprising obtaining at least one parameter of the decompression from the ISOBMFF compliant file, the at least one parameter being obtained from a dedicated ISOBMFF box at the top-level of the ISOBMFF compliant file or being stored within a sample description of the at least one obtained sample.

14. The method of claim 13, wherein the at least one parameter comprises an identifier of a compression algorithm or wherein a DEFLATE compression algorithm is used by default in case no compression algorithm is identified within the ISOBMFF compliant file.

15. The method of claim 13, further comprising defining a data block as a function of one or several samples, decompressing the at least one obtained compressed sample comprising decompressing one or several samples according to the data block.

* * * * *